US008676859B2

(12) United States Patent  (10) Patent No.: US 8,676,859 B2
Sayal et al.  (45) Date of Patent: Mar. 18, 2014

(54) METHOD AND SYSTEM FOR ANALYZING DATA STORED IN A DATABASE

(75) Inventors: Mehmet Oguz Sayal, Foster City, CA (US); Kemal Guler, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 507 days.

(21) Appl. No.: 12/691,101

(22) Filed: Jan. 21, 2010

(65) Prior Publication Data

US 2011/0178974 A1 Jul. 21, 2011

(51) Int. Cl.
*G06F 17/30* (2006.01)
*G06F 17/24* (2006.01)

(52) U.S. Cl.
USPC .......................................... 707/802; 715/255

(58) Field of Classification Search
None
See application file for complete search history.

(56) References Cited

U.S. PATENT DOCUMENTS

| | | | | |
|---|---|---|---|---|
| 6,018,742 | A * | 1/2000 | Herbert, III | 1/1 |
| 6,836,777 | B2 * | 12/2004 | Holle | 1/1 |
| 6,839,680 | B1 | 1/2005 | Liu et al. | |
| 7,624,114 | B2 * | 11/2009 | Paulus et al. | 1/1 |
| 2003/0101449 | A1 | 5/2003 | Bentolila et al. | |
| 2003/0110055 | A1* | 6/2003 | Chau | 705/1 |
| 2006/0085465 | A1* | 4/2006 | Nori et al. | 707/101 |
| 2006/0149695 | A1* | 7/2006 | Bossman et al. | 706/48 |
| 2007/0073734 | A1* | 3/2007 | Doan et al. | 707/100 |
| 2008/0077598 | A1* | 3/2008 | Wilmering et al. | 707/100 |
| 2008/0126176 | A1 | 5/2008 | Iguchi | |
| 2009/0204590 | A1* | 8/2009 | Yaskin et al. | 707/3 |
| 2009/0313210 | A1* | 12/2009 | Bestgen et al. | 707/2 |
| 2010/0241644 | A1* | 9/2010 | Jackson et al. | 707/760 |
| 2011/0106828 | A1* | 5/2011 | Mauge | 707/765 |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: "The Collective Intelligence Platform," Online, http://www.baynote.com/technology/platform/ 2010.
Hottolink Inc.; "Recognize" Online, http://www.hottolink.co.jp/english/reconize.html, 2009.
Andrejko et al.: "User Characteristics Acquisition from Logs with Semantics" 8. Slovak University of Technology in Bratislava.

(Continued)

*Primary Examiner* — Tarek Chbouki

(57) ABSTRACT

One embodiments of the present invention is directed to a data-analysis system, implemented as one or more electronic computers that execute one or more computer programs. The data-analysis system includes a metadata-extraction component that extracts indications of data entities and relationships between data entities from data stored on one or more electronic-memory and mass-storage devices, a relationship-inference component that analyzes the data to infer additional relationships between data entities, a context-determination component that determines one or more contexts within which the data is analyzed, and a navigational analysis tool, displayed on a computer device, that provides an interface that allows for navigation between relationship-interconnected data entities within each of one or more contexts, for viewing representations of data entities and relationships, and for editing and updating the relationships.

19 Claims, 22 Drawing Sheets

(56) References Cited

OTHER PUBLICATIONS

Hongjun Lu et al: "Extending a Web Browser with Client-Side Mining," Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why WUBAT? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking," 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

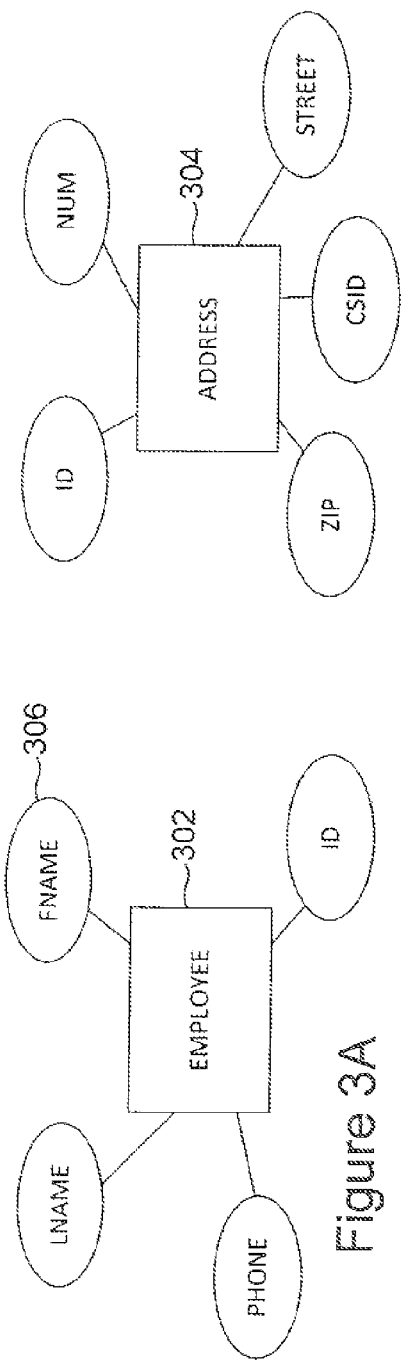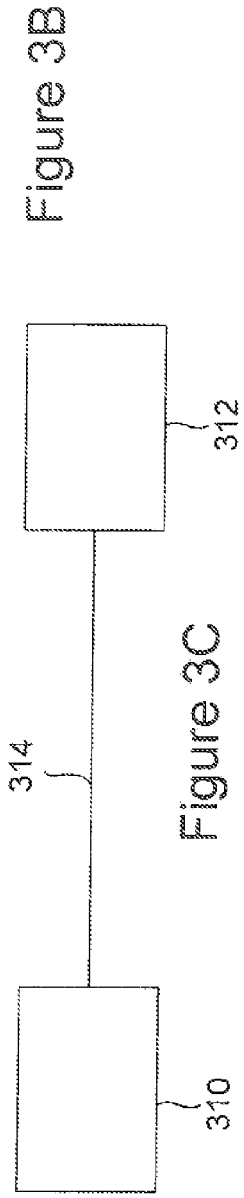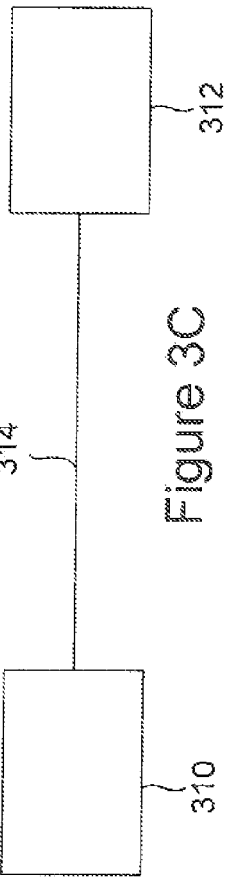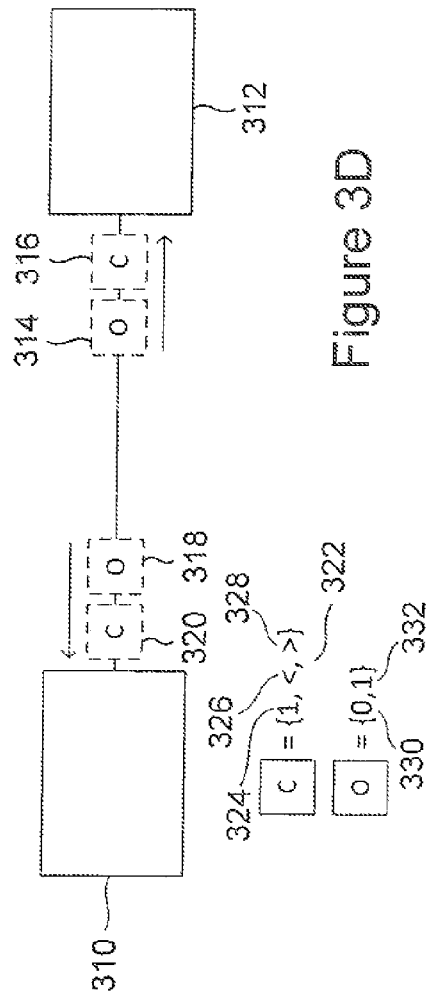

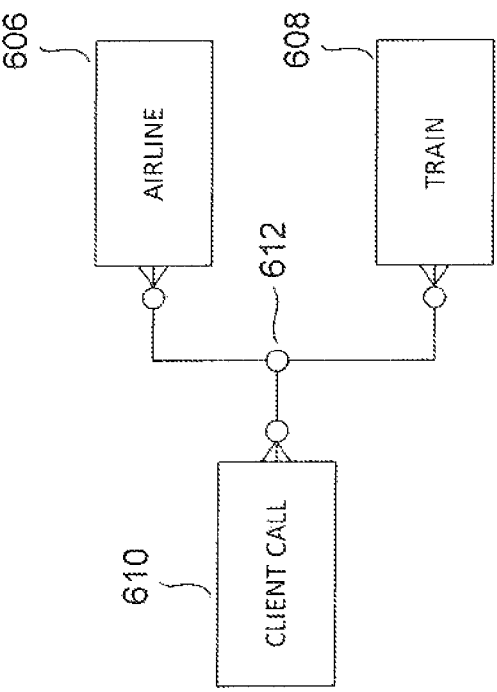
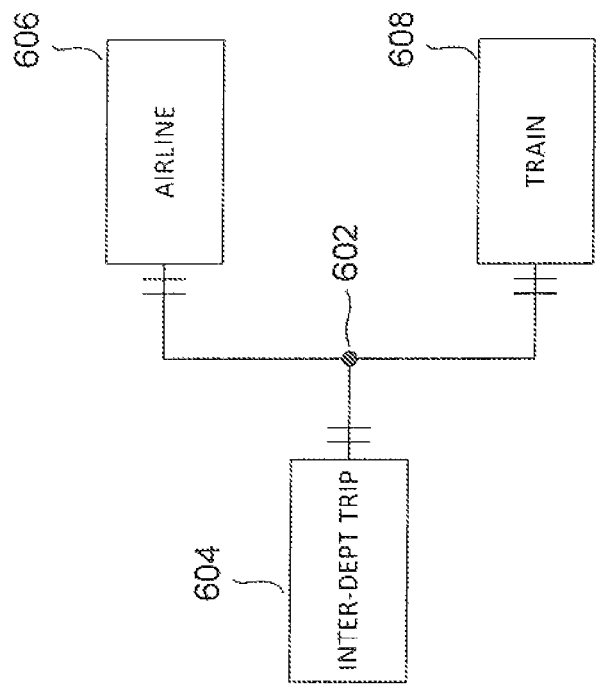

METHOD AND SYSTEM FOR ANALYZING DATA STORED IN A DATABASE

TECHNICAL FIELD

The present invention is related to electronic databases and, in particular, to a method and system for analyzing the contents of an electronic database in order to determine relationships among the various data stored in the database.

BACKGROUND OF THE INVENTION

Research on, and development of, electronic databases is an important field of computer science. Electronic databases underlie many of the computer-based technologies and services that underlie many aspects of commerce, education, research and development, and other social activities.

There are a variety of different types of electronic databases. In general, databases, comprise information stored in electronic memory and mass-storage devices within computer systems. The data is managed by, and access is provided to the data through interfaces provided by, database management systems, generally complex computer programs that each execute on one or multiple computer systems. Often, an electronic database is an integral component of various different types of information systems, business systems, service systems, and other types of specialized computer programs and systems. As one example, an accounting and personnel-management system used by the financial and personnel departments of a small company may be implemented as a collection of computer programs and routines that execute on computers of a centralized computing facility within the company and that access data managed by a database management system. In such systems there are many different hierarchical levels of understanding and knowledge of the data entities and relationships between data entities managed by a database management system. The data may be organized according to a database schema developed by a database administrator and/or application-program developer. While the database administrator may have one understanding of the data, based on the database schema, application-program developers may have a different understanding of the data, based on how the data, and various database entities, are used and manipulated by the application programs. Various human personnel may employ the application programs, or directly access the database management system, to manage real-world accounting data and personnel records, and therefore may have a quite different understanding of the data entities and data relationships within the database created on their behalf by the application programs through the database-management-system interface.

In general, according to best database practices, all of the different levels of understanding and knowledge of the data stored within a database is extensively documented, so that those with access to the documentation can straightforwardly access the various different levels of understanding and knowledge of the data stored in an electronic database. Such understanding is needed when, for example, the electronic data within the database needs to be moved to another database or to another type of database, analyzed for various auditing, enhancement, and efficiency purposes, used by newly developed application programs, or accessed without the availability of the application programs and/or database management system through which the data is normally accessed. Unfortunately, complete documentation for all the various different levels of meaning and understanding of data stored in an electronic database is often incomplete, of poor quality, or lacking altogether. The task of obtaining the various different levels of knowledge and understanding of the data stored in an electronic database can be complex, tedious, time-consuming, and often intractable. Those having need for understanding data stored in electronic databases continue to seek tools to facilitate extracting and reconstructing the logic, meaning, and understanding of data stored in electronic databases.

BRIEF DESCRIPTION OF THE DRAWINGS

FIGS. 3A-6B illustrate examples of aspects of one entity-relationship diagramming method commonly employed to illustrate relationships, logic, and understanding of data within a relational database.

DETAILED DESCRIPTION OF THE INVENTION

Certain embodiments of the present invention are directed to tools for extracting and reconstructing identities of data entities and relationships between data entities within data stored in electronic databases. In one embodiment of the present invention, metadata included in a database schema is extracted from the data and/or from a database management system, the extracted metadata is enhanced with additional, statistically derived relationships between database entities, contexts are obtained from the data and/or application programs that access, create, and update the data, and a browser-like tool is provided facilitate analysis of the data, metadata, relationships, and contexts in order to determine identities of data entities and relationships between data entities within data stored.

For purposes of describing one embodiment of the present invention, it is assumed that the data is relational data created using, and managed by, a relational database management system ("RDBMS"). It should be noted, at the onset, that method and system embodiments of the present invention can be implemented for application to a variety of other types of databases and data, including object-oriented data stored within object-oriented database systems, network data stored within network-data databases, data stored within hierarchical databases, and even data stored in indexed files or flat files. In a first subsection, below, an overview of the problem domain to which certain methods and systems of the present invention are directed is provided. In a second subsection, certain method and system embodiments of the present invention are discussed.

Overview of Problem Domain

Figure 1:
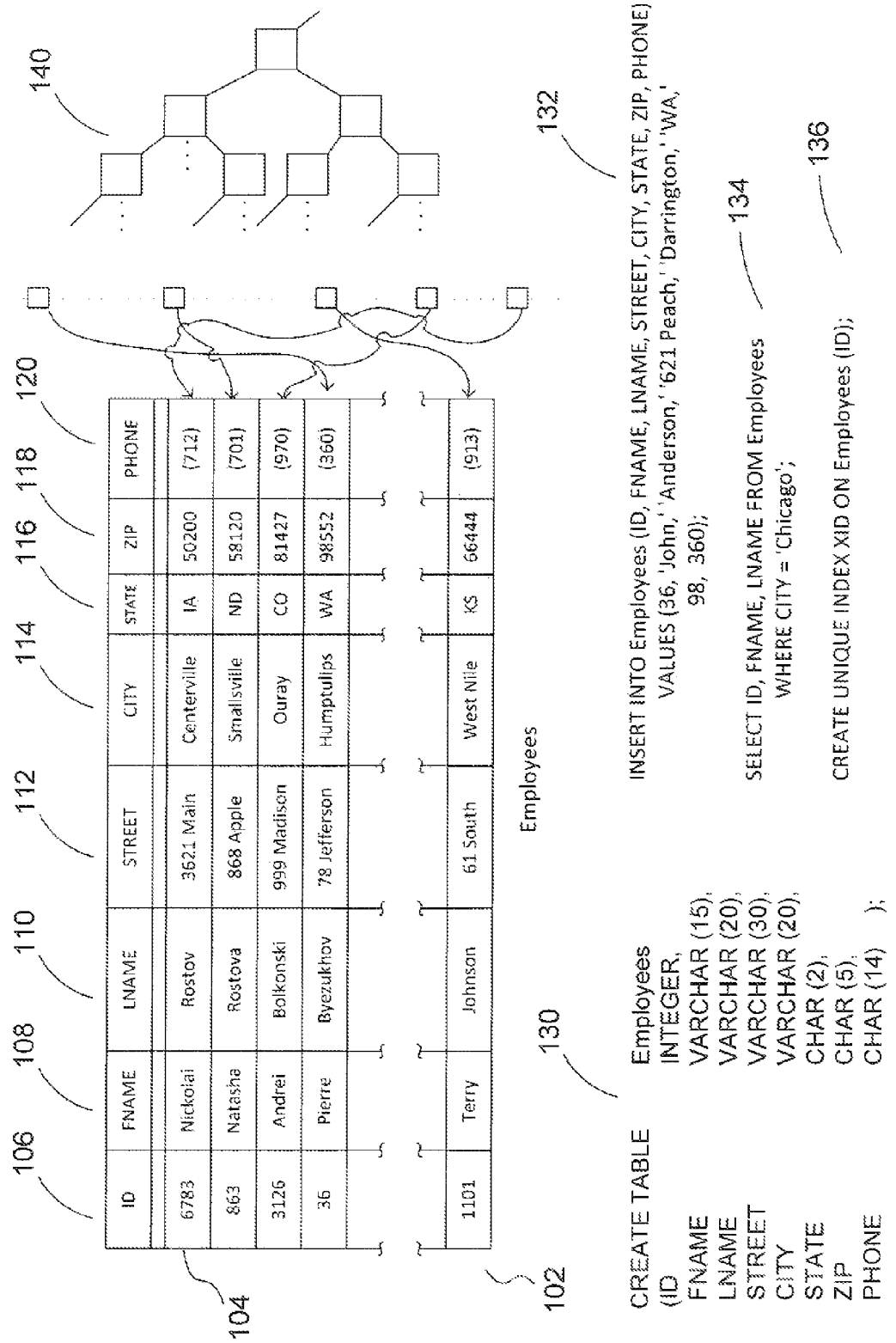
FIGS. 1-2 illustrate examples of various aspects of relational data stored within a relational database management system.
Figure 2:
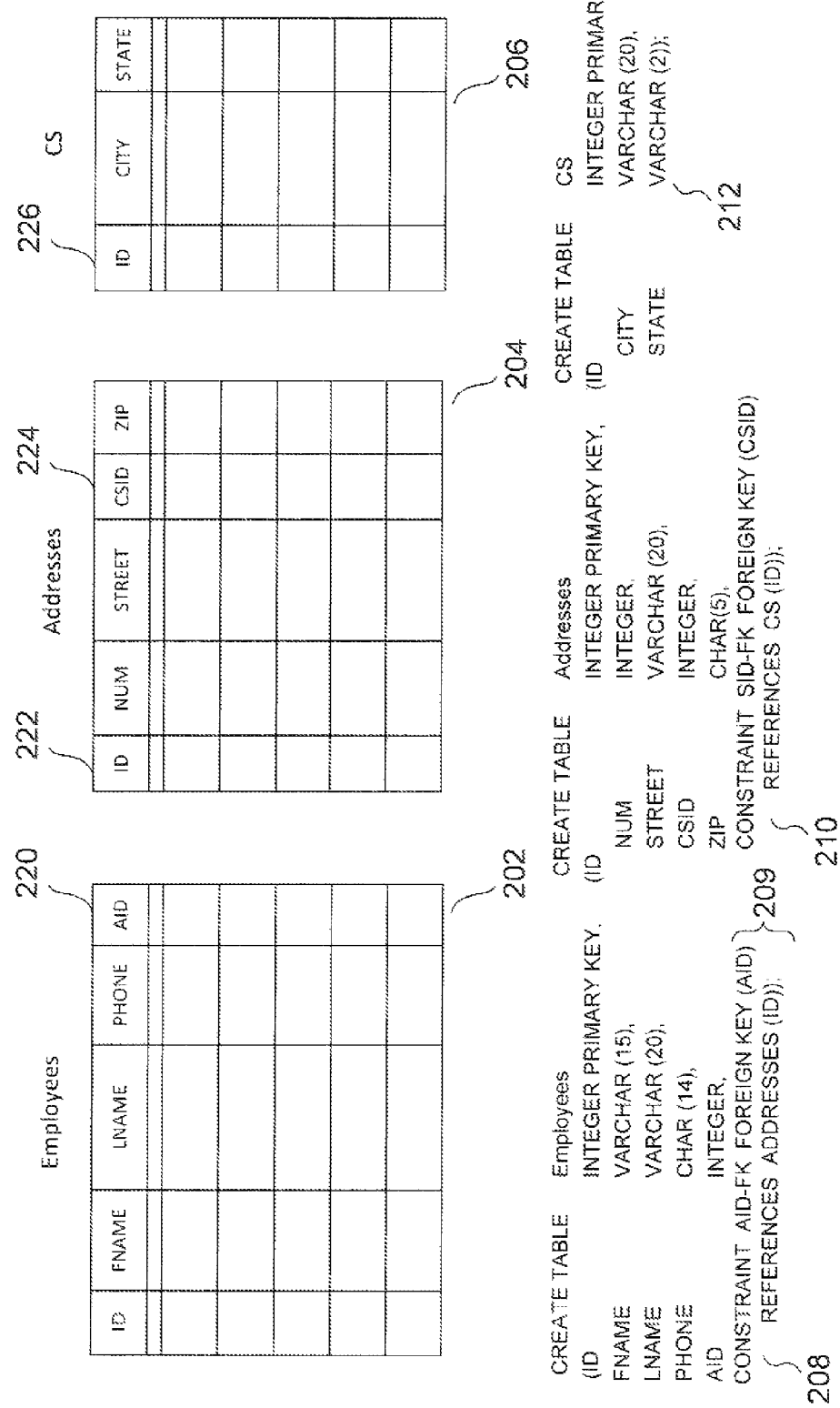

FIGS. 1-2 illustrate examples of various aspects of relational data stored within a relational database management system. According to the relational model, data is stored within tables, such as the table "Employees" 102 illustrated in FIG. 1. Each table is a database entity, and each table generally represents instances of a type of concrete or abstract entity described by the data. For example, in FIG. 1, the table "Employees" represents all of the employees within an organization. Each employee is represented by a row of the table. For example, the first row 104 represents the employee Nickolai Rostov.

The object represented by a relational-database-table entry is described, or characterized, by the values of various attributes. Each column in the relational-database table constitutes a different attribute. For example, each employee represented by an entry in the table "Employees" (102 in FIG. 1) is characterized by a numeric identifier 106, a first name 108, a last name 110, a street address 112, a city of residence 114, a state of residence 116, a zip code 118, and a phone number 120.

In relational database systems, tables are generally created using a structured-query-language ("SQL") create-table command, or another create-table query command in databases that do not provide an SQL interface. The SQL create-table command for the table "Employees" shown in FIG. 1 is provided below the representation of that table 130 in FIG. 1. Entries can be inserted into a table using an SQL insert command, such as the insert command 132 shown in FIG. 1. Data can be extracted from a relational table by an SQL select command, such as select command 134 shown in FIG. 1, which retrieves the ID, first name, and last name of all employees that live in Chicago. In general, the select command produces one or more rows in a temporary table defined by the select command. There are many different types of SQL commands that can be used for creating, updating, managing, and deleting data.

In order to facilitate various database operations, an index can be created on one or more columns of a table, using an SQL create-index command, such as the create-index command 136 shown in FIG. 1. An index may be a tree-like data structure 140 that allows rows of a table with particular attribute values, or attribute values within particular ranges, to be quickly accessed. Alternatively, hash tables may used for indexes, for more efficient access to table rows having a particular attribute value. In many cases, relational database tables may contain thousands, hundreds of thousands, millions, or more rows, and may be distributed dynamically in a computer system between electronic memory and mass-storage devices. Accessing entries within relational database tables may therefore be a high-latency, computationally complex task, and database management systems are implemented to provide efficient and accurate access and management operations, including the use of indexes.

In general, there are many different ways to store data within a database management system. Often, various different approaches to data storage are associated with different advantages and disadvantages. For example, using few tables, each having many attributes, may facilitate certain access and update operations, but at the expense of a great deal of redundant data that may end up being stored within the database, and at the expense of slowing other access and update operations. FIG. 2 illustrates a different approach to storing the information stored in the Employees table shown in FIG. 1. As shown in FIG. 2, information contained in the Employees table of FIG. 1 is partitioned between the three tables "Employees" 202, "Addresses" 204, and "CS" 206 in FIG. 2. The SQL create-table commands for each of these tables, 208, 210, and 212, respectively, are shown below the tables. Rather than including the address information in the Employees table, in the alternative method for storing the data shown in FIG. 2, each entry in the Employees table includes an AID attribute 220 that references a numeric identifier 222 of a particular address, and each address entry likewise includes a CSID attribute 224 that references a numeric identifier 226 of a particular city/state pair. According to the alternative approach, shown in FIG. 2, certain data redundancy is eliminated and certain types of update operations are made less time consuming and less computationally complex. For example, in the case that two or more employees share the same address, multiple records in the Employees table shown in FIG. 1 would contain the same address information. By contrast, in the alternative method shown in FIG. 2, only a single entry for the address shared by multiple employees would need to be stored in the addresses table. Consider a case in which the zip code for a set of addresses is changed. In the method illustrated in FIG. 1, in the absence of a zip-code index, the entire Employees table would need to be accessed, row by row, to identify those addresses for which the zip code needs to be changed in order to carry out the appropriate zip code changes. By contrast, in the method illustrated in FIG. 2, only the presumably much smaller Addresses table would need to be scanned. However, while the entire record, or entry, for an employee is obtained from one table entry, in the method shown in FIG. 1, a join operation is needed to obtain all of the information from an employee in the method shown in FIG. 2. A join-type select command 230 is shown in FIG. 2 for obtaining information about employees who live in Chicago.

As discussed above, there are many different layers of understanding and meaning of data stored in a database, such as relational data stored in a relational database system. For example, without the foreign-key constraints embedded in the create-table commands in FIG. 2, discussed below, the fact that the AID column of the Employees table refers to an entry in the Addresses table may not be obvious to an analyst provided only with the table definitions. However, to the database administrator who designed the database schema, the relationship between the Employees table and Addresses table is well-known and intuitively obvious. Quite often, a relational database may contain tens or hundreds of different tables, each having two to tens or more of columns. Often, information stored in those tables is interrelated, with certain of the interrelationships quite specifically defined and constrained. In certain cases, these relationships are expressed and encoded in a database schema. For example, returning to FIG. 2, the fact that attribute "AID" of the Employees table 202 refers to an address ID contained in the table "Addresses" is formally encoded in the create-table command by a foreign-key-constraint clause 209. The constraint clause may trigger various types of database operations in the case that an update operation is attempted which would violate the constraint. The names of tables and columns also represent information considered to be part of the database schema. However, there are also many different types of relationships between tables and table columns that may be defined and understood either by creators of application programs which create and manage the data through a database-system interface or are known and understood by various human personnel that interact with the application programs to create and manage high-level information systems, such as the above-mentioned accounting and personnel system, but which are neither encoded as metadata nor documented in natural-language documents.

There are many different ways to represent relationships between data entities with data stored in a database. One popular method is to use entity relationship diagrams. FIGS. 3A-6B illustrate examples of aspects of one entity-relationship diagramming method commonly employed to illustrate relationships, logic, and understanding of data within a relational database. FIGS. 3A-B show graphical representations of tables 202 and 204 in FIG. 2. Each table in a relational database is a data entity, and entities are represented by rectangles containing the name of a table, such as rectangles 302 and 304 in FIGS. 3A-B that represent the Employees table (202 in FIG. 2) and the Addresses table (204 in FIG. 2). Attributes of the table are shown as ellipses containing the name of the attributes connected to the entity. For example, the attribute "FNAME" of the table "Employees" (202 in FIG. 2) is represented by ellipse 306 in FIG. 3A.

Relationships between tables are shown by lines. For example, in FIG. 3C, a relationship between a first table 310 and a second table 312 is shown by line 314. The lines are generally annotated. FIG. 3D describes the annotation conventions. The type of relationship represented by the line from the first entity 310 to the second entity 312 is described by two graphical symbols 314 and 316, and the relationship between the second entity 312 and the first entity is described by two graphical symbols 318 and 320. The symbols 316 and 320 are cardinality symbols. A cardinality symbol may be one of the three symbols 322 shown within brackets in FIG. 3D. The first of these symbols 324 indicates that the relationship is one-to-one, and the second two symbols 326 and 328 are used to describe one-to-many and many-to-one relationships. Symbols 314 and 318 are optionality symbols, indicating that a relationship is optional, by symbol 330, or that a relationship is required, represented by symbol 332.

Figure 4A:
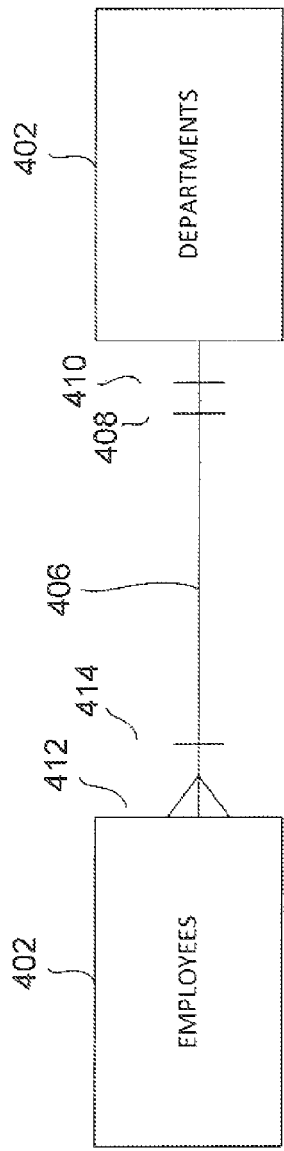
Figure 4B:
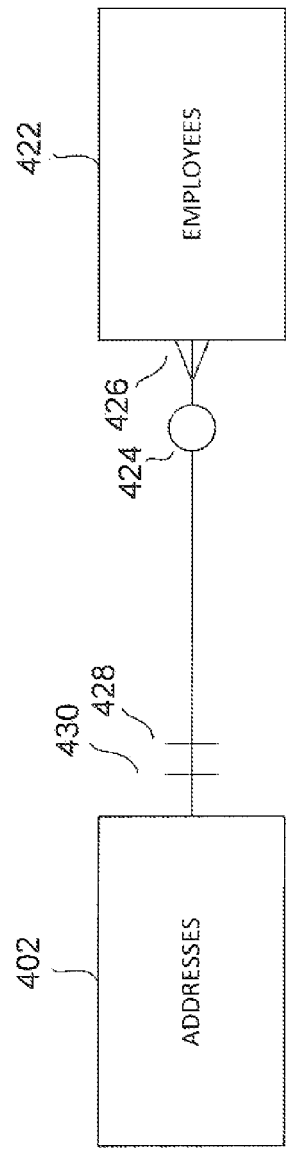
Figure 4C:
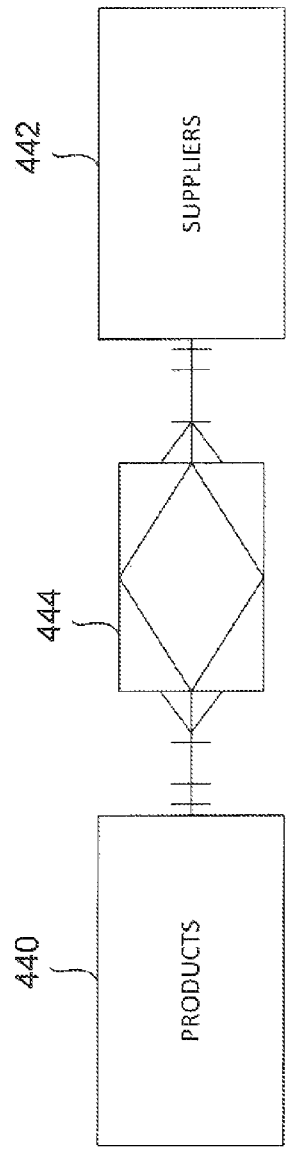

FIGS. 4A-C illustrate the use of the annotated relationship lines, described above with reference to FIGS. 3C-D. In FIG. 4A, an Employees table 402 is related to a Departments table 404 by relationship 406. Because each employee must be a member of a single department, annotation symbols 408 and 410 are employed, and because a department may contain multiple employees, but each department must have at least one employee, annotation symbols 412 and 414 are used. FIG. 4B illustrates a relationship between an Addresses table 420 and an Employees table 422. Annotation symbols 424 and 426 indicate that an address may or may not be associated with an employee and that any particular address may be associated with multiple employees, while annotation symbols 428 and 430 indicate that each employee is required to be associated with a single address. In FIG. 4C, a many-to-many relationship between a Products table 440 and a Suppliers table 442 is shown. The many-to-many relationship is indicated by the rectangle with an inscribed diamond 444, generally implemented, in a relational database, by a table with entries containing pairs of references, one reference to a product and the other to a supplier.

Figure 5A:
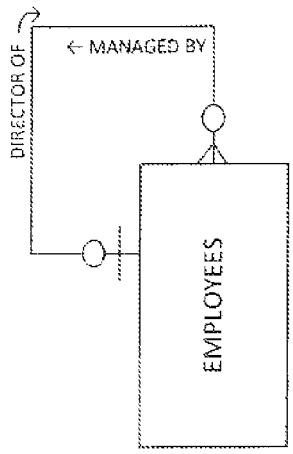
Figure 5B:
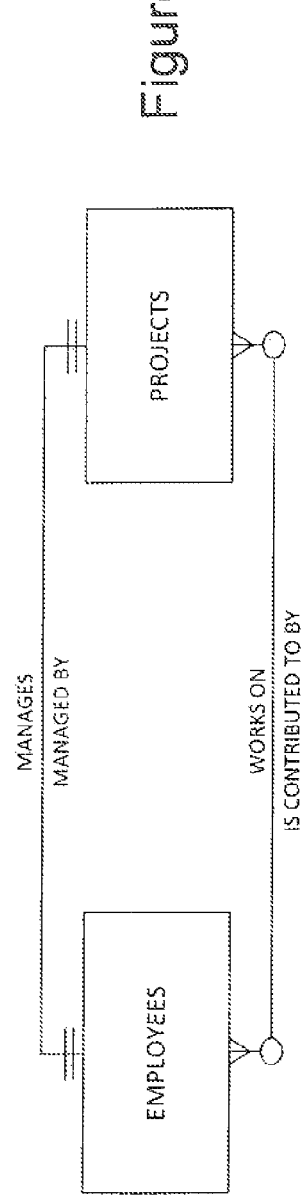
Figure 5C:
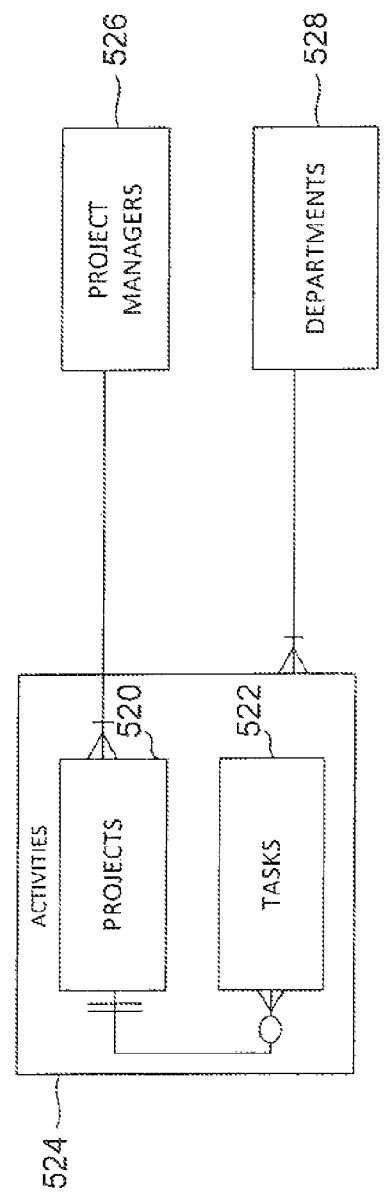

There may be relationships between entries within a table, as shown in FIG. 5A, in which an employee may be a director of another employee and an employee may be managed by another employee. There may be multiple relationships between tables, as shown in FIG. 5B. As shown in FIG. 5C, two or more entities may be grouped together into a higher-order construct, with possible relationships between external tables and tables of the higher-order construct as well as relationships between external tables and the higher-order construct. For example, in FIG. 5c, a Projects table 520 and a Tasks table 522 are together considered to be members of a higher-order Activities entity 524, with a Project Managers table 526 having a relationship to the Projects table 520 and a Departments table 528 having a relationship to the higher-order activities entity 524.

Additional types of relationships may be described in the entity-relationship diagramming method. For example, as shown in FIG. 6A, one entity may have an exclusive-or relationship with two other entities. In this example, the exclusive-or relationship is indicated by a filled disk 602. In this example, each row of the inter-department trip table 604 may be related either to an entry in the Airline table 606 or to an entry in the Train table 608, since all departments in the company can be reached from one another by a single-leg travel itinerary using either an airline or train. By contrast, in FIG. 6B, there is an inclusive-or relationship between the Client Call table 610 and the Airline 606 and Train 608 tables, indicated by the unfilled disk 612, since it may take multi-leg travel itineraries in order to reach any particular client from any department location within the company.

Figure 7:
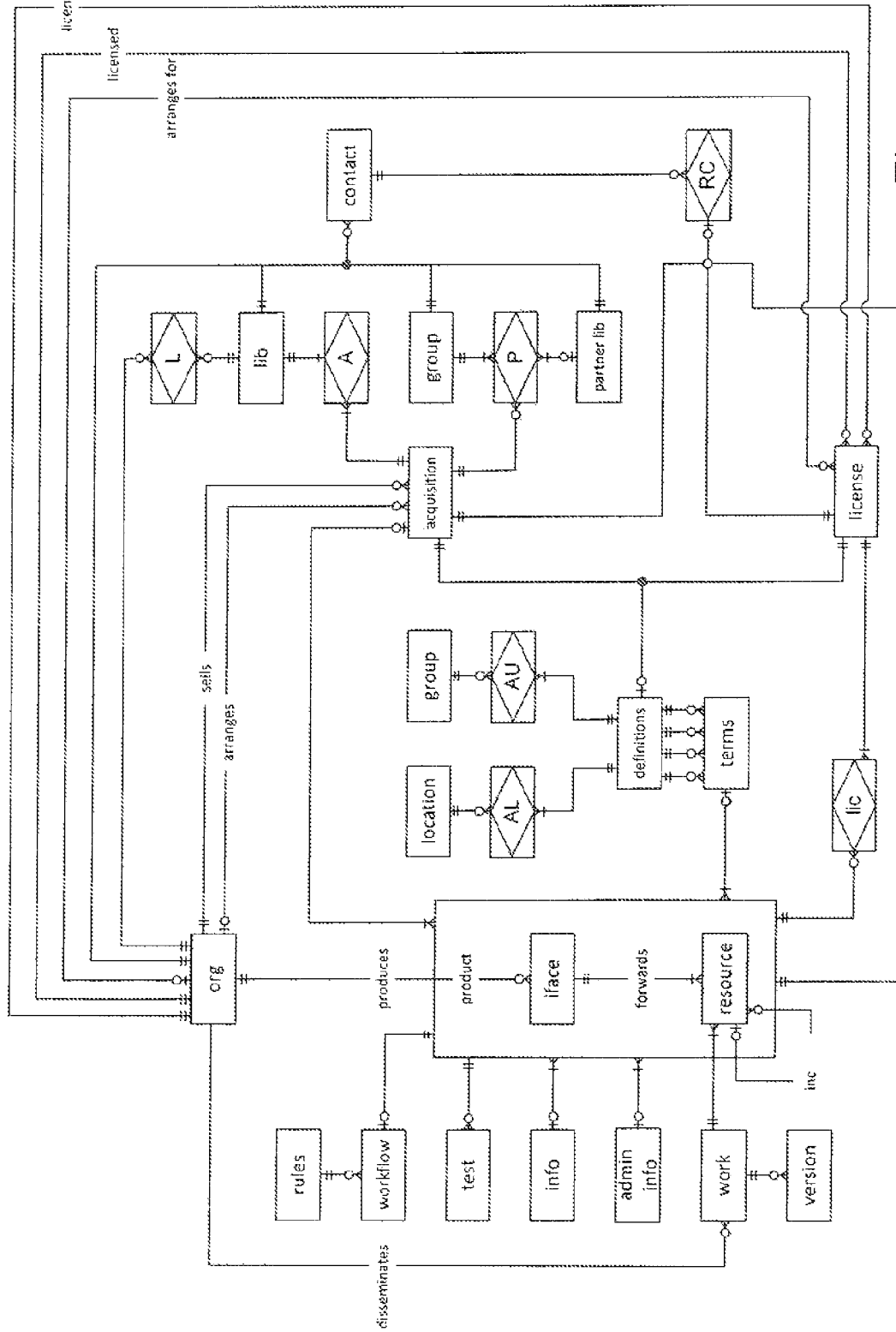
FIG. 7 shows an example entity-relationship diagram that includes 27 entities, one higher-order construct, and many different types of relationships between entities.

FIG. 7 shows an example entity-relationship diagram that includes 27 entities, one higher-order construct, and many different types of relationships between entities. In a complete entity-relationship diagram, each relationship is annotated both with the cardinality and optionality symbols, on each end, as well as with English-language annotations, such as the annotations "licenses" 702 in FIG. 7. Many relational databases used for commercial information systems may contain tens to hundreds of tables and many hundreds to thousands of relationships between them. Thus, the entity-relationship diagrams may be complex and contain an enormous amount of information. A manual analysis of even a very simple database to generate an entity-relationship diagram, such as that shown in FIG. 7, would be an extremely time-consuming task and error-prone task. Manual analysis of databases of sizes generally encountered in typical organizations would not be feasible, both because of the time that would be needed to make column-to-column comparisons, even one of which could easily take from days to years, depending on the sizes of the tables from which the columns are selected, as well as because of the great probability that manual analysis would generate erroneous conclusions and results.

Figure 8:
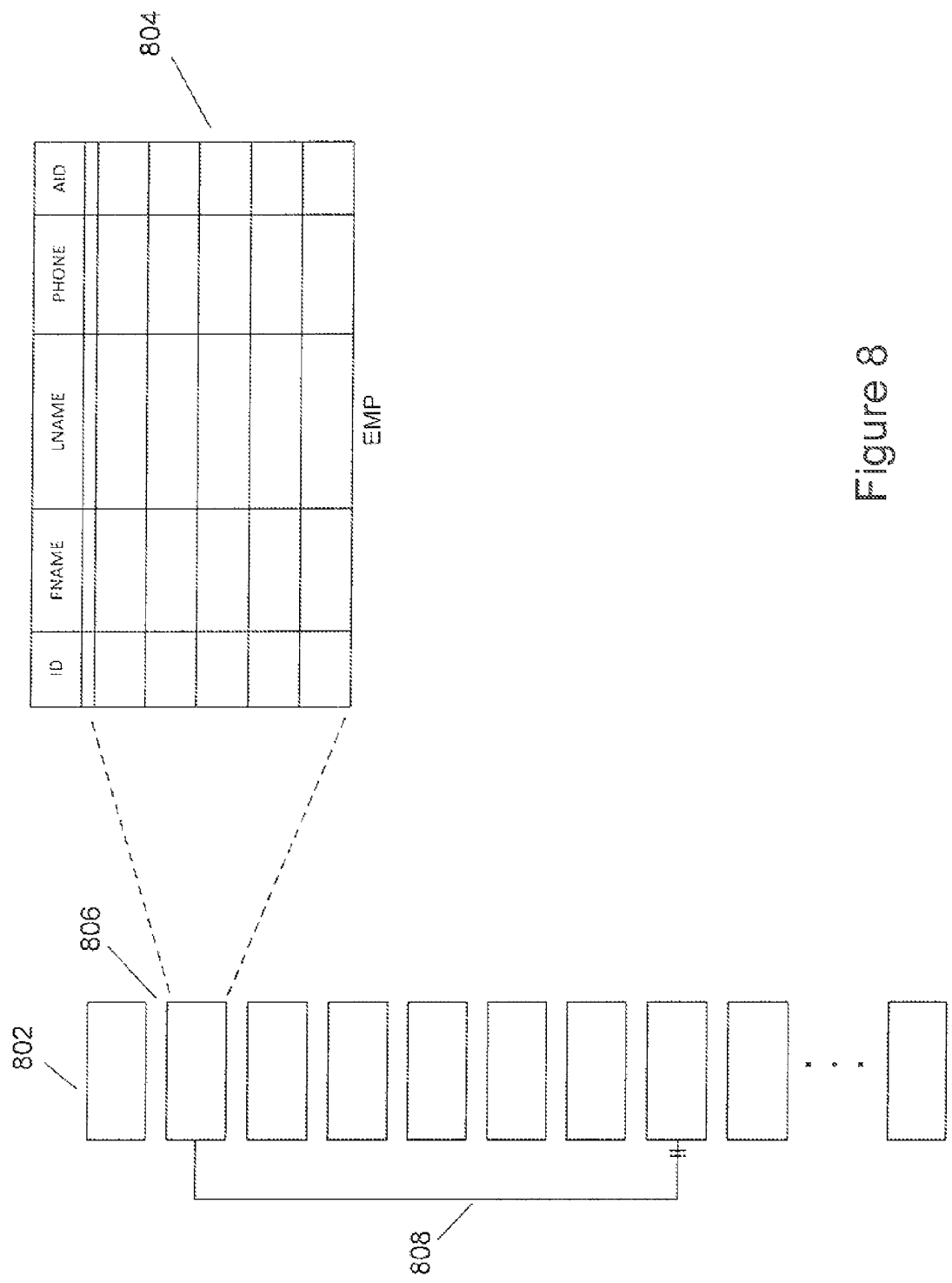
FIG. 8 illustrates an example of that portion of the information contained in an entity-relationship diagram that may be extracted from a database management system for a particular database.

Unfortunately, entity-relationship diagrams, such as that shown in FIG. 7, are often not developed for particular databases. Instead, the databases developed more or less ad hoc, over time, and expand and evolve as the systems in which they are components are used and enhanced. In such cases, no one may have a complete understanding of the data stored within the database. Instead, the knowledge may be dispersed among many different people, and significant portions of the knowledge may be lost or inaccessible, at any point in time. Frequently, the logic and understanding of a database may need to be reconstituted or reconstructed from the data stored within a database and, in some cases, from applications that access the data. Considering a typical RDBMS, only a small portion of the information in a complete entity-relationship diagram may be directly extracted using RDBMS tools. FIG. 8 illustrates an example of that portion of the information contained in an entity-relationship diagram that may be extracted from a database management system for a particular database. The information includes a list of the tables, or entities, represented by the column of rectangles 802 in FIG. 8. The RDBMS can provide the names of the tables and attributes of the tables, represented by table representation 804 for table 806 in the list of tables 802 in FIG. 8, as well as data types of attributes. In addition, certain relationships defined by constraints, such as relationship 808 defined by a foreign-key constraint, may also be extracted from the RDBMS. The types of information contained in FIG. 8 are considered to be the database schema. In an RDBMS, the database schema is stored within the database as metadata that can be extracted by RDBMS tools. However, all of the many other types of relationships between data entities that may be known to database administrators, application-program developers, and even personnel who use the application programs and RDBMS, are not so easily extracted.

Figure 9:
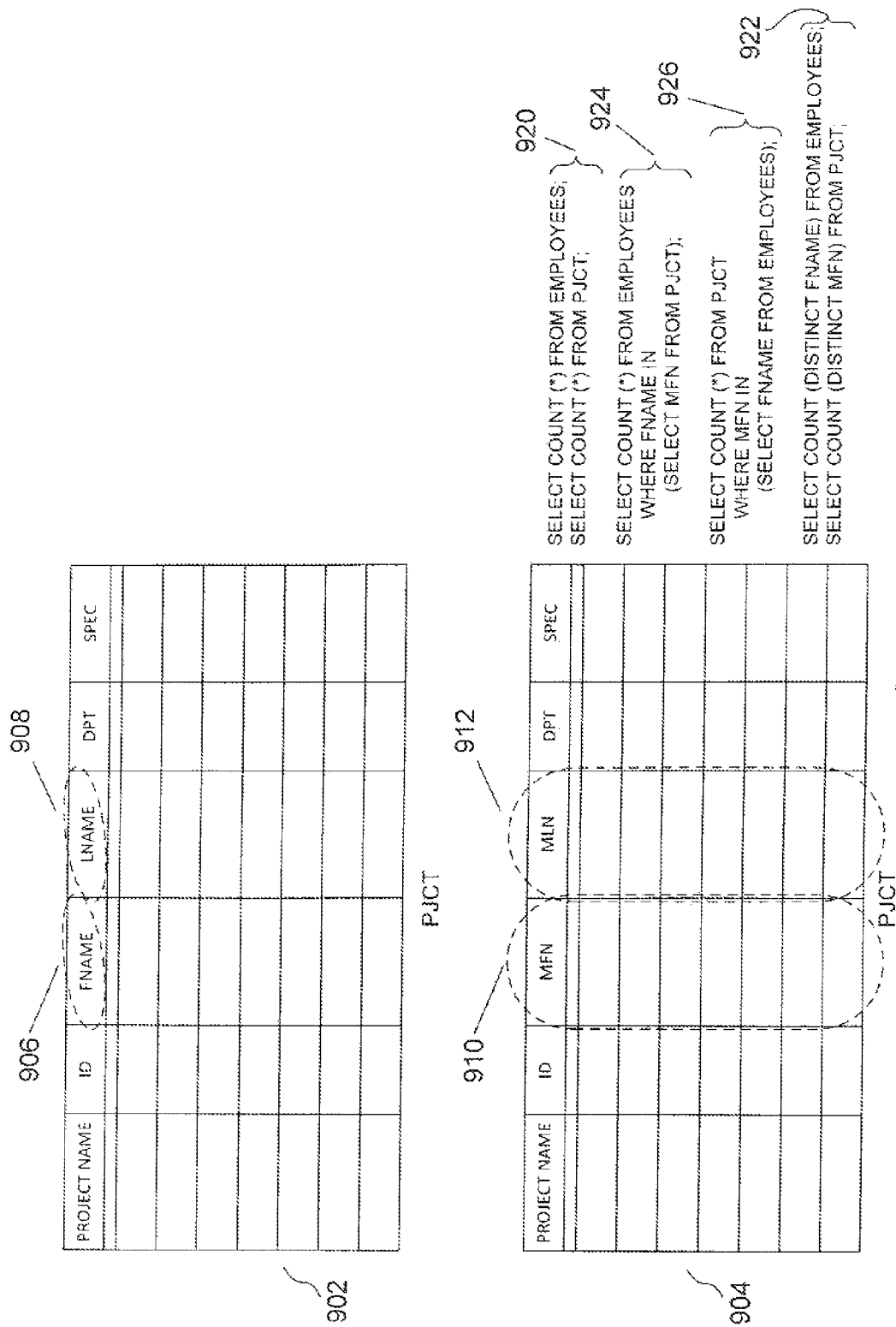
FIG. 9 illustrates two examples of possible approaches to column comparisons, according to one embodiment of the present invention.

The problem of reconstructing relationships from data can be defined as a problem of considering each possible pair of columns, within tables of the database, to determine whether or not the columns are related. FIG. 9 illustrates two examples of possible approaches to column comparisons, according to one embodiment of the present invention. In FIG. 9, a table "PJCT," two variations 902 and 904 of which are represented in FIG. 9, has been identified from a database schema obtained from an RDBMS which also contains the Employees, Addresses, and CS tables shown in FIG. 2. There may be a relationship between table "PJCT" and the table "Employees" (202 in FIG. 2), as indicated by the similarity in the names of attributes 906 and 908 of the table "PJCT" and the identically named attributes of the Employees table (202 in FIG. 2). Quite often, columns that contain identical or related values are similarly named, during database construction. However, consider the case of the PJCT table 904 in FIG. 9, in which these two columns have quite different names, "MFN" 910 and "MLN" 912, respectively. In this case, there is no straightforward correspondence between attribute "MFN" of the PJCT table and attribute "FNAME" of the Employees table. However, one can undertake a analysis of various statistics and metrics related to the values of the MFN column of the PJCT table and the FNAME column of the Employees table. For example, one can determine the total number of rows in both columns, using SQL statements 920, the total number of distinct entries in the two columns using SQL statements 922, the number of rows in the FNAME column of the Employees table which contain a value contained in the MFN column of the PJCT table, using SQL statement 924, and the number of rows in the MFN column of table "PJCT" which contain a value contained in the FNAME column of the Employees table, using SQL statement 926. These types of statistical information and metrics that can be obtained from the RDBMS concerning a selected pair of columns may provide indications that the columns are related. For example, when each value in a first column occurs in a second column, then the values in the first column may in fact reference values in the second column. When many, but not all, of the values in a pair of columns are similar, there may be a relationship between the two columns. Additional types of statistics and metrics that can be used to infer relationships between columns of relational tables include: (1) the data types associated with the columns; (2) the lengths of length-parameterized data types associated with the columns; (3) the range of values that occur in each of the columns; (4) the number of unique values stored in each column; (5) the maximum and minimum values stored in each column; (6) mean and median values stored in the two columns; (7) the variance of the values in each of the columns; (8) quantiles of percentiles for the values stored in each column; (9) a set of highest-valued, lowest-valued, or other-valued data values stored in each column. When, for example, two columns have the same, or similar, data types, the same or similar maximum and minimum values, and the same or similar median or average values, a relationship between the columns may be inferred, according to certain embodiments of the present invention.

Figure 10:
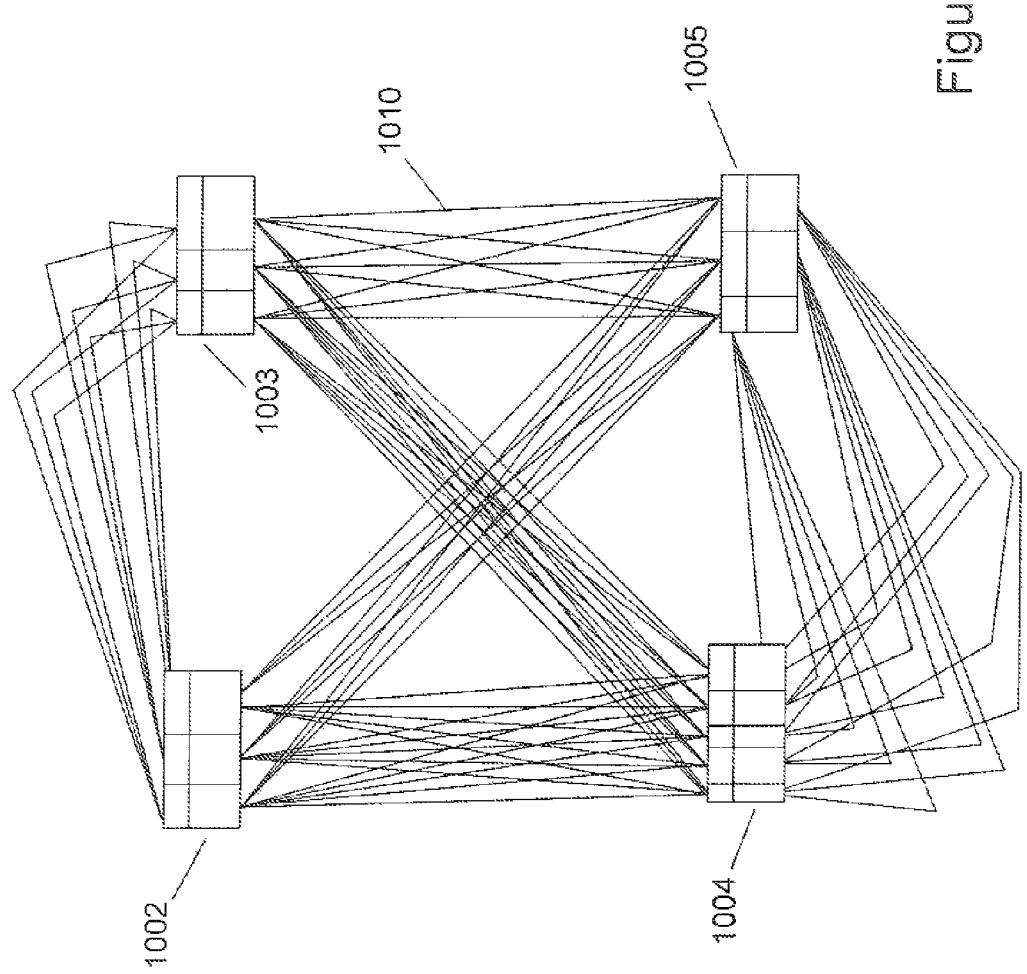
FIG. 10 illustrates an example of the complexity of carrying out a pairwise analysis of various statistics for each pair of columns within a four-table database.

Unfortunately, carrying out the pairwise statistical analysis of each pair of columns within the database can be an extremely time-consuming and complex task. FIG. 10 illustrates an example of the complexity of carrying out a pairwise analysis of various statistics for each pair of columns within a four-table database. In the database illustrated in FIG. 10 there are four tables 1002-1005, three of which have three columns and one of which has five columns. To fully analyze the database in order to discover relationships between all possible pairs of columns, 196 different pairwise comparisons need to be made, illustrated in FIG. 10 by lines, such as line 1010. Each comparison may involve using RDBMS operations, such as those specified by SQL statements 920, 922, 924, and 926 in FIG. 9. Each comparison may equivalent, computationally, to joining the two columns, generally a computationally expensive operation, particularly when tables are lengthy. The pairwise analysis of relationships, according to this technique, may take weeks or months of computing time for large databases.

Certain Embodiments of the Present Invention

Embodiments of the present invention provide tools, methods, and systems for addressing the problem of reconstructing the logic, knowledge, and understanding of a database, such as the logic, knowledge, and understanding representing by an entity-relationship diagram, such as that shown in FIG. 7, from the data and metadata obtained from a database. As discussed above with reference to FIGS. 9 and 10, a naïve approach involving comparisons of all possible pairs of columns would be extremely computationally inefficient, and may involve enormous amounts of tedious, manual analysis of the results of many pairwise combinations of columns by a human analyst. Embodiments of the present invention provide a much more tractable, computationally efficient method and system for obtaining logic, understanding, and knowledge of data stored within a database.

Figure 11:
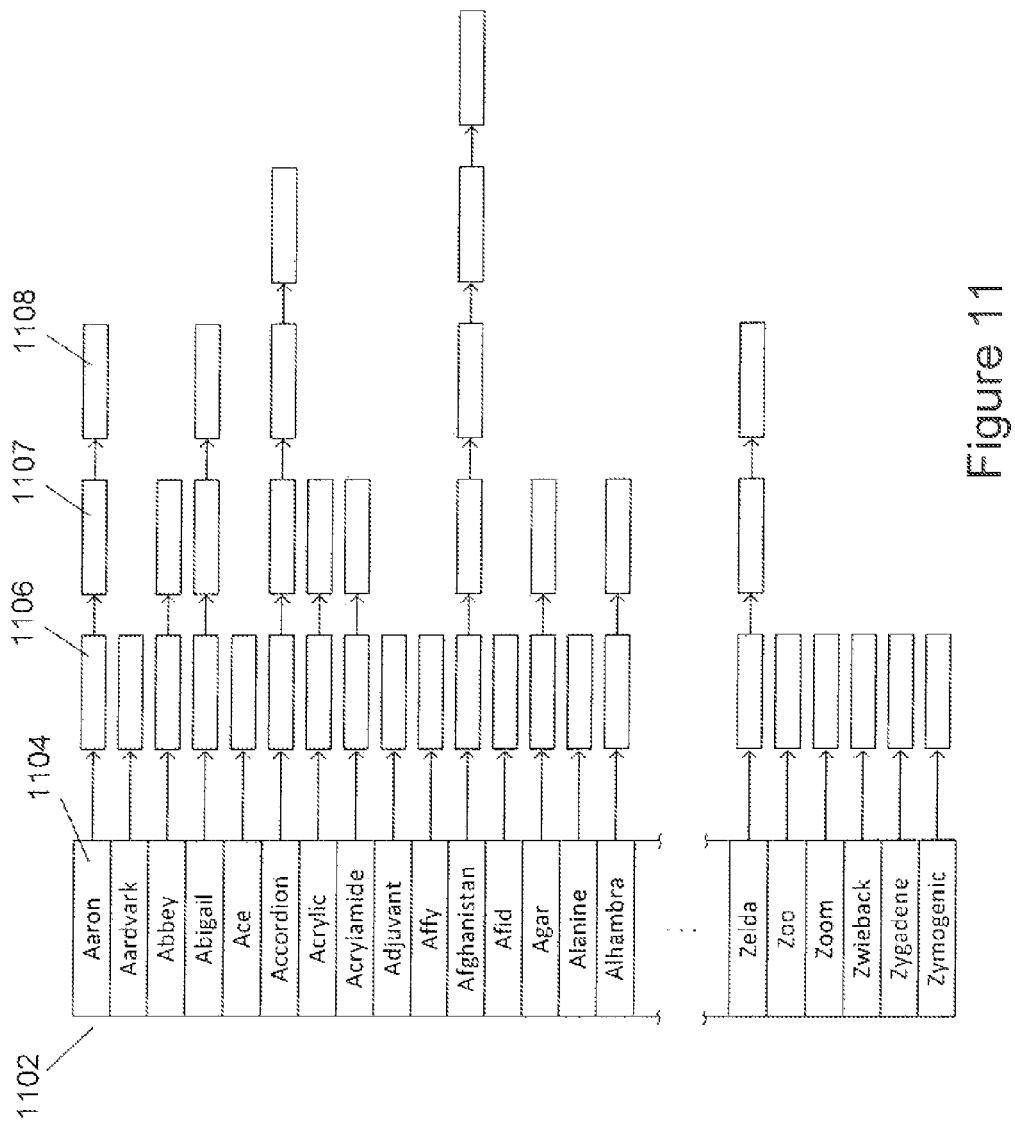
FIG. 11 illustrates an example keyword index.

FIG. 11 illustrates an example keyword index. It is a computationally expensive, but entirely tractable problem to prepare a keyword index for all of the attributes of each type in a database. Types of attributes are defined by the data types by which the attributes are declared in create-table statements. For example, in FIG. 2, the attribute ID for the Employees table (202 in FIG. 2) has the data type "integer," while the data type of the attribute "FNAME" is a variable character string with a maximum length of 15 characters. Different attributes can be partitioned into data-type-compatible sets of attributes, the attributes of each set having compatible data types. The rules by which the compatibility of two data types is determined may vary, from database to database and from analysis to analysis. For example, the CHAR and VARCHAR data types may be compatible, although the former is a fixed-length character string while the latter is a variable-length character string. Integer attributes may be compatible with other integer attributes, but are not generally compatible with character-based attributes. All the values for a particular type-compatible group of columns can be extracted from the database, and an index created into the tables and columns of the database for the extracted values. In FIG. 11, all of the values contained in character and variable-character fields of a database have been extracted and are shown in column 1102. Each extracted value, such as extracted value 1004, is associated with a list of references, such as the list of references 1106-1108 associated with value "Aaron" 1104, which stores the tables and columns within the tables in which the value occurs. A reference may also reference a list of rows of each column in which the value occurs. A keyword index, such as that shown in FIG. 11, can be analyzed to discover potential relationships between columns. For example, when references to a first and second column cannot be found in any list of references associated with any value in the index, then the first and second columns are probably not related to one another, since they do not share any common values. By contrast, if a reference to a first column is almost always found in reference lists in which a reference to a second column occurs, then it can be concluded that the first and second columns may be, indeed, related to one another.

Figure 12A:
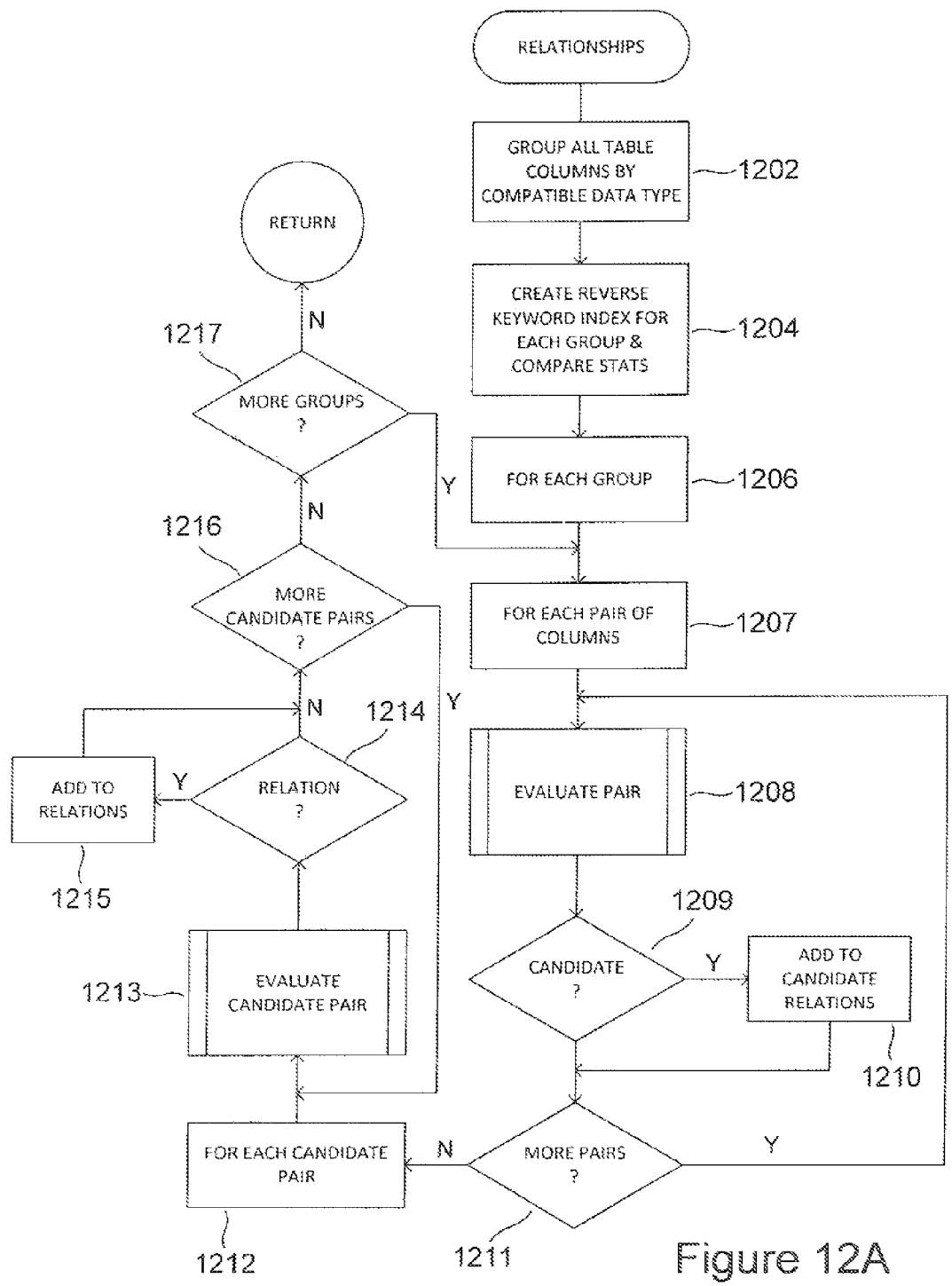
FIGS. 12A-D provide example control-flow diagrams for a routine "relationships" that is used to discover potential relationships between columns of tables within a relational database according to one embodiment of the present invention.

FIGS. 12A-D provide example control-flow diagrams for a routine "relationships" that is used to discover potential relationships between columns of tables within a relational database according to one embodiment of the present invention. FIG. 12A provides a control-flow diagram for the routine "relationships." In step 1202, all of the table columns in the RDBMS are grouped by data-type compatibility. In step 1204, a keyword index is created for each group of table columns obtained in step 1202. Then, in the for-loop of steps 1206-1217, all of the pairs of columns in each group are evaluated for relatedness. First, in the inner for-loop of steps 1207-1211, each pair of columns in a group is evaluated, by invoking the routine "evaluate pair" in step 1208, to determine whether or not the pair is a candidate pair or, in other words, potentially related. Candidate pairs are added to a candidate-relations list, in step 1210. Then, in the second inner for-loop of steps 1212-1216, each of the candidate pairs contained in the first inner for-loops of steps 1207-1211 are evaluated, by the routine "evaluate candidate pair," called in step 1213, to determine whether or not to add the candidate pair to a final set of relations for the group, in step 1215. Thus, upon termination of the routine "relationships," a group of relations of each group of data-type-compatible columns is prepared.

Figure 12B:
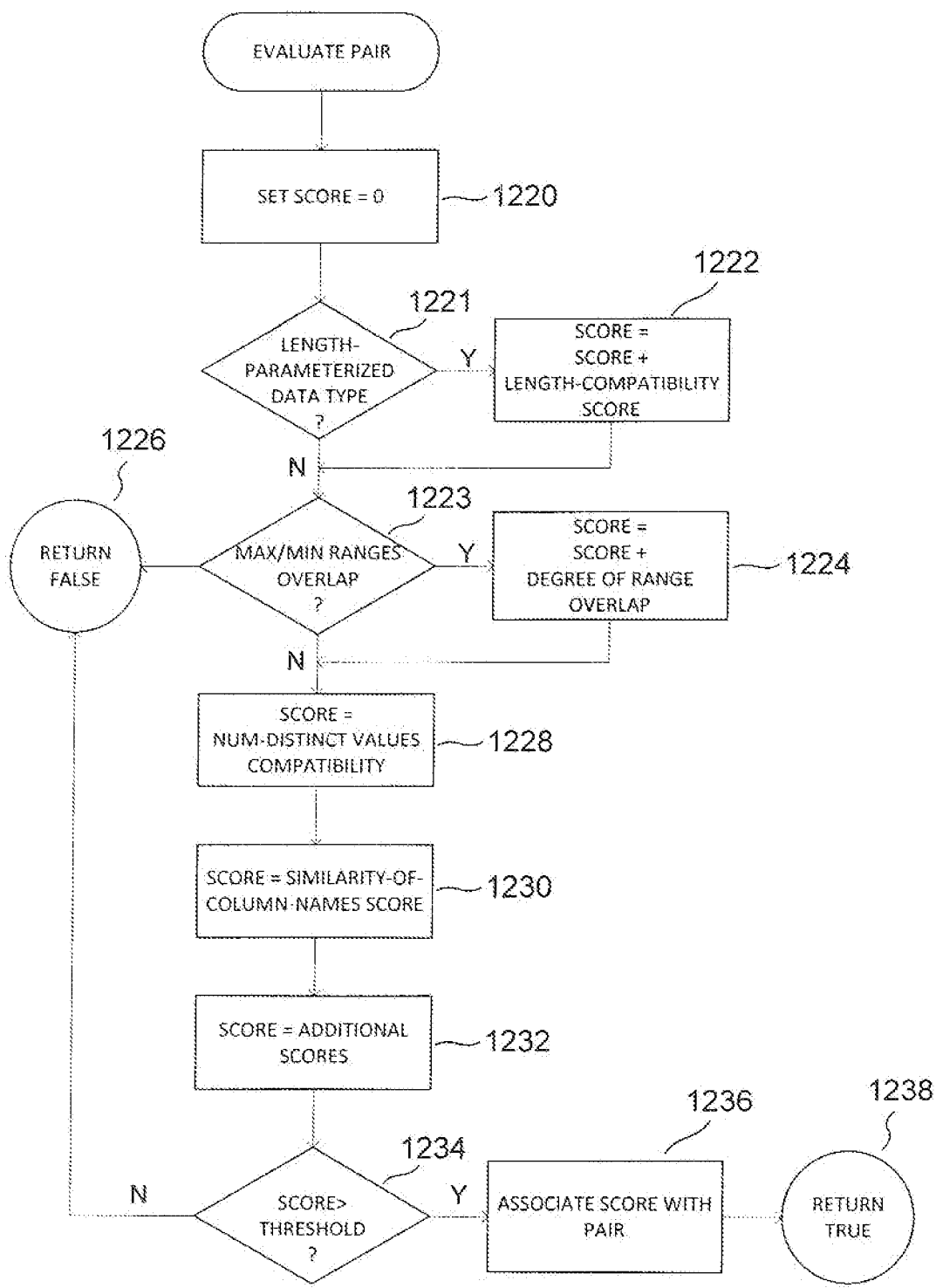

FIG. 12B provides a control-flow diagram for the routine "evaluate pair," called in step 1208 of FIG. 12A. In step 1220, a local variable "score" is set to the value "0." Then, in step 1221, the data type of the pair is considered to determine whether or not it is a length-parameterized data type, such as a VARCHAR data type. If so, then in step 1222, a length-compatibility score is computed from the two length parameters for the two columns in a pair to determine a length-compatibility score, which is added to the local variable "score." Next, in step 1223, the minimum and maximum values in the two columns, which can be obtained using SQL commands from the RDBMS, are used to compare the range of values in the first column with the range of values in the second column. If the ranges overlap, then the score is updated with a degree-of-range-overlap score in step 1224. Otherwise, a FALSE value is returned by the routine in step 1226, since, when the ranges do not overlap, the columns are probably not related. Next, in step 1228, the number of distinct values in the two columns is compared to produce a number-of-distinct-values-compatibility score, which is added to the local variable "score." When the number of distinct values in the two columns is similar, there is a higher likelihood that the two columns are related. Next, in step 1230, names of the columns are compared to produce a similarity-of-column-name score, which is added to the local variable "score." In step 1232, many additional types of comparisons between the two columns can be undertaken to produce additional scores which are added to the local-variable score. Finally, in step 1234, the score is compared against a threshold value. When the score exceeds the threshold value, there is a likelihood that the two columns are related, and the score is associated with the pair of columns, in step 1236, and a value of TRUE is returned in step 1238. Otherwise, a value of FALSE is returned in step 1226. The data used in the considerations made, in the routine "evaluate pair," to determine whether a pair of columns should be considered a candidate relation are relatively easily computed, and thus this routine can be viewed as a filtering operation to filter out clearly unrelated columns prior to undertaking a more computationally expensive, statistical analysis of the relatedness of candidate pairs of columns.

Figure 12C:
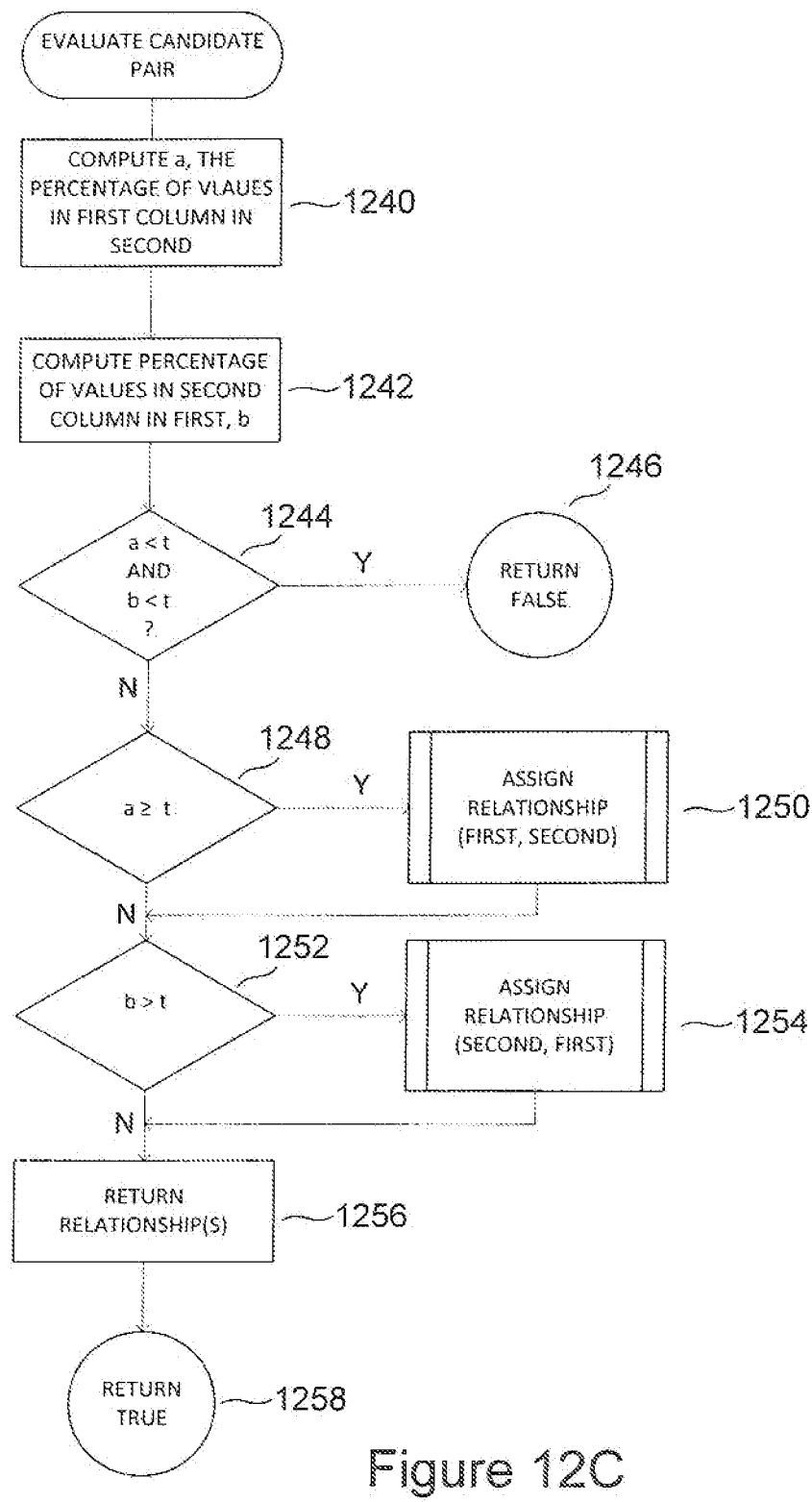

FIG. 12C provides a control-flow diagram of the routine "evaluate candidate pair," called in step 1213 of FIG. 12A. In step 1240, the percentage of values that occur in the first column of a pair that also occur in the second column of a pair is computed, and in step 1242, the percentage of values that occur in the second column that also occur in the first column of a pair of columns is computed. Either or both of SQL queries and the keyword index can be used to obtain the results of steps 1240 and 1242, with the keyword index used as an initial filter, in certain embodiments of the present invention, to quickly compute a number of keywords that occur in both columns. When both percentages are below a threshold value, as determined in step 1244, then FALSE is returned, in step 1246, to indicate that the pair of columns is probably not sufficiently related to include in a set of potential relationships. When the percentage computed in step 1240 is greater than a threshold value, as determined in step 1248, then an initial guess as to type of relationship is assigned to the relationship by calling the routine "assign relationship" in step 1250. This invocation of the routine "assign relationship" determines, in certain embodiments, the optionality and cardinality of the relationship from the first column to the second column. When the percentage computed in step 1242 exceeds the threshold value, as determined in step 1252, the routine "assign relationship" is again called in step 1254 to provide an initial annotation for the relationship from the second column to the first column. Finally, in step 1256, the relationships determined by the routine "evaluate candidate pair" are returned, or stored in memory, for subsequent use and a value of TRUE is returned in step 1258.

Figure 12D:
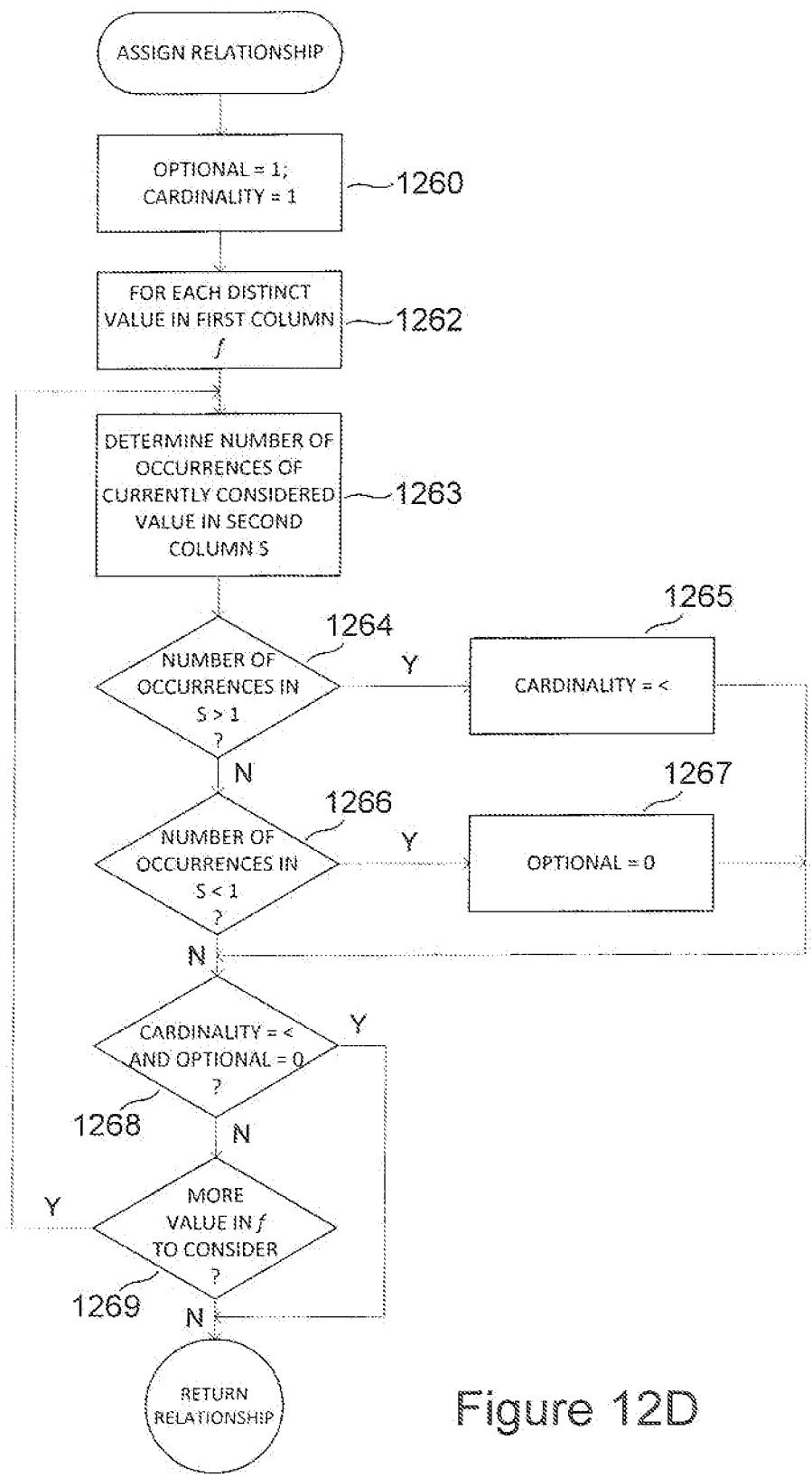

FIG. 12D provides a control-flow diagram for the routine "assign relationship," called in steps 1250 and 1254 of FIG. 12C. In this routine, the graphical annotations described above, with reference to FIGS. 3C-D, are provided for one half of a potential two-way relationship discovered by statistical analysis between a pair of columns. In step 1260, the optionality and cardinality for one direction of the relationship are both set to the symbol "|." Then, in the for-loop of steps 1262-1269, each value of the first column is considered during each iteration. In step 1263, the number of occurrences of the currently-considered first-column value in the second column is determined. Generally, it is most efficient to select the first-column values for the iterations of the for-loop of steps 1262-1269 and to determine the number of second-column entries with the currently-considered first-column value by accessing indexes constructed for the two columns. When, for any first-column value, there are multiple occurrences in the second column, as determined in step 1264, then the cardinality is set to "<," in step 1265. When there are no occurrences of the currently-considered first-column value in the second column, as determined in step 1266, then the optionality is set to "O," in step 1267. When the cardinality is set to "<" and the optionality is set to "O," as determined in step 1268, then the for-loop terminates, and the relationship is returned. Otherwise, when there are additional first-column values to consider, as determined in step 1269, then a next iteration of for-loop is launched, by returning to step 1263. Otherwise, the relationship is returned.

The types of considerations made in FIG. 12D are meant to be representative of the types and qualifications, or annotations, of relationships that may be discovered by statistical analysis and that may be computed as additional information related to statistically-inferred relationships. In certain embodiments of the present invention, only the statistically derived relationships, rather than additional annotations, are computed. In other embodiments of the present invention, other types of considerations are made to determine additional qualifications or annotations of relationships, and many different types of annotations or qualifications may be derived, in addition to, or instead of, the entity-relationship-diagram annotations determined in FIG. 12D.

Figure 13:
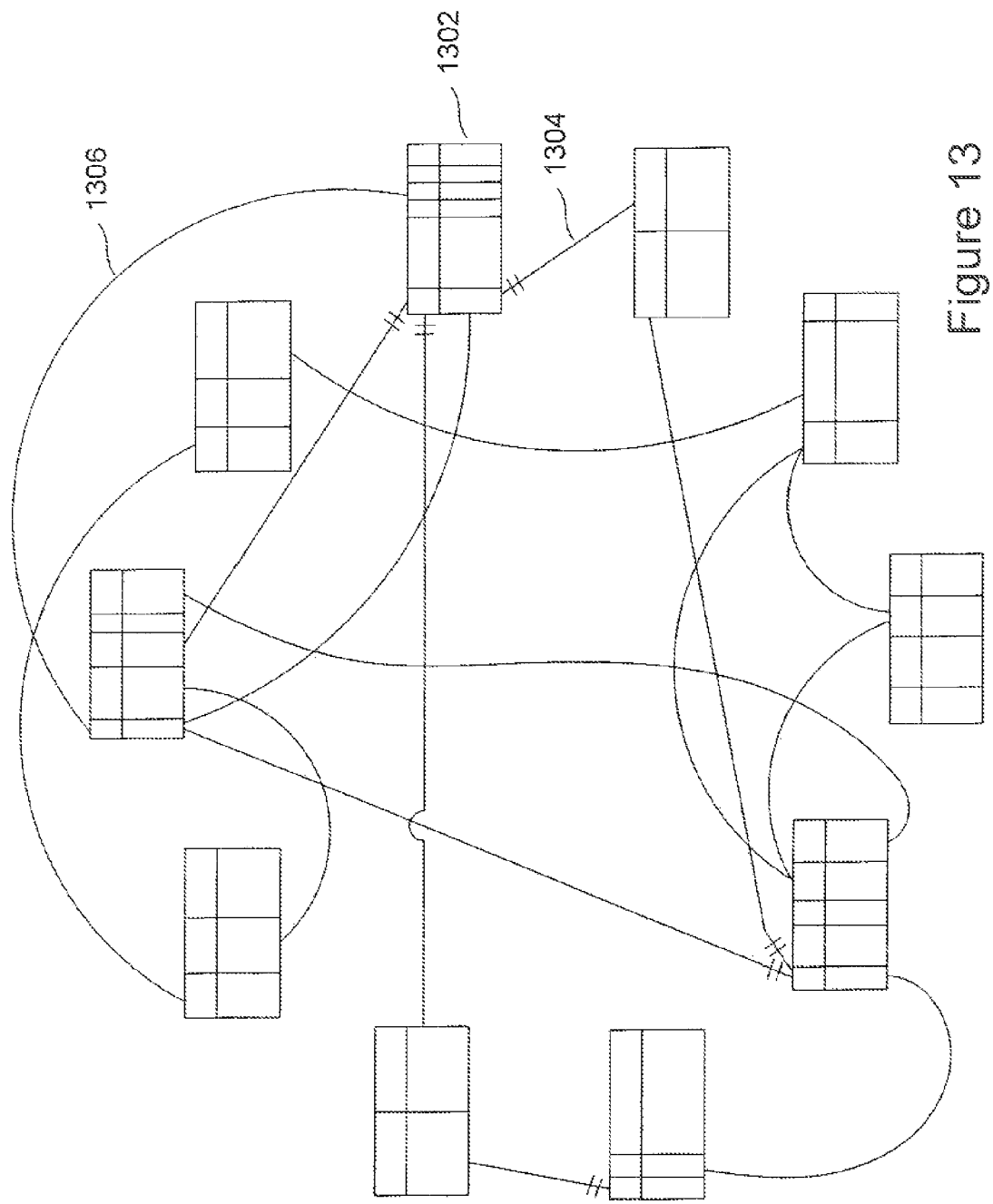
FIG. 13 illustrates an example of one possible representation of the data-entity and data-entity-relationship information obtained from the metadata extracted from a database as well as obtained by analysis of various statistics using the routine "relationships," discussed above with reference to FIGS. 12A-D.

Thus, one system embodiment of the present invention uses the routine "relationships," discussed above with reference to FIGS. 12A-D, or similar relationship-inferring statistical analysis, along with the metadata that can be extracted from a database, as discussed above with reference to FIG. 8, to prepare an initial entity-relationship diagram or equivalent representation of the data entities and relationships between data entities in a database. FIG. 13 illustrates an example of one possible representation of the data-entity and data-entity-relationship information obtained from the metadata extracted from a database as well as obtained by analysis of various statistics using the routine "relationships," discussed above with reference to FIGS. 12A-D. The initial entity-relationship diagram, or other representation, includes the names of all tables and columns within the tables, such as table 1302, all relationships specified in the metadata, such as the foreign-key relationship 1304, illustrated by straight-line relationships in FIG. 13, and a potentially large number of statistically inferred relationships, such as statistically inferred relationship 1306, shown as curved lines in FIG. 13. At this point, the task of reconstructing the logic, understanding, and knowledge of the database data is far more tractable, to a human analyst, than when the human analyst is provided with only the extracted metadata, as discussed with reference to FIG. 8. However, even with the information shown in FIG. 13 at hand, the task may still be imposing. Method and system embodiments of the present invention provide a navigational annotation tool, similar to a web browser, that allows an analyst to navigate the initial entity-relationship diagram, shown in FIG. 13, in order to evaluate the potential relationships, represented by curved arrows in FIG. 13, and include them, or delete them from, a final entity-relationship diagram, or set of entity-relationship diagrams, that represent the reconstructed or extracted logic, understanding, and meaning of the data within the database obtained by the analyst.

Figure 14:
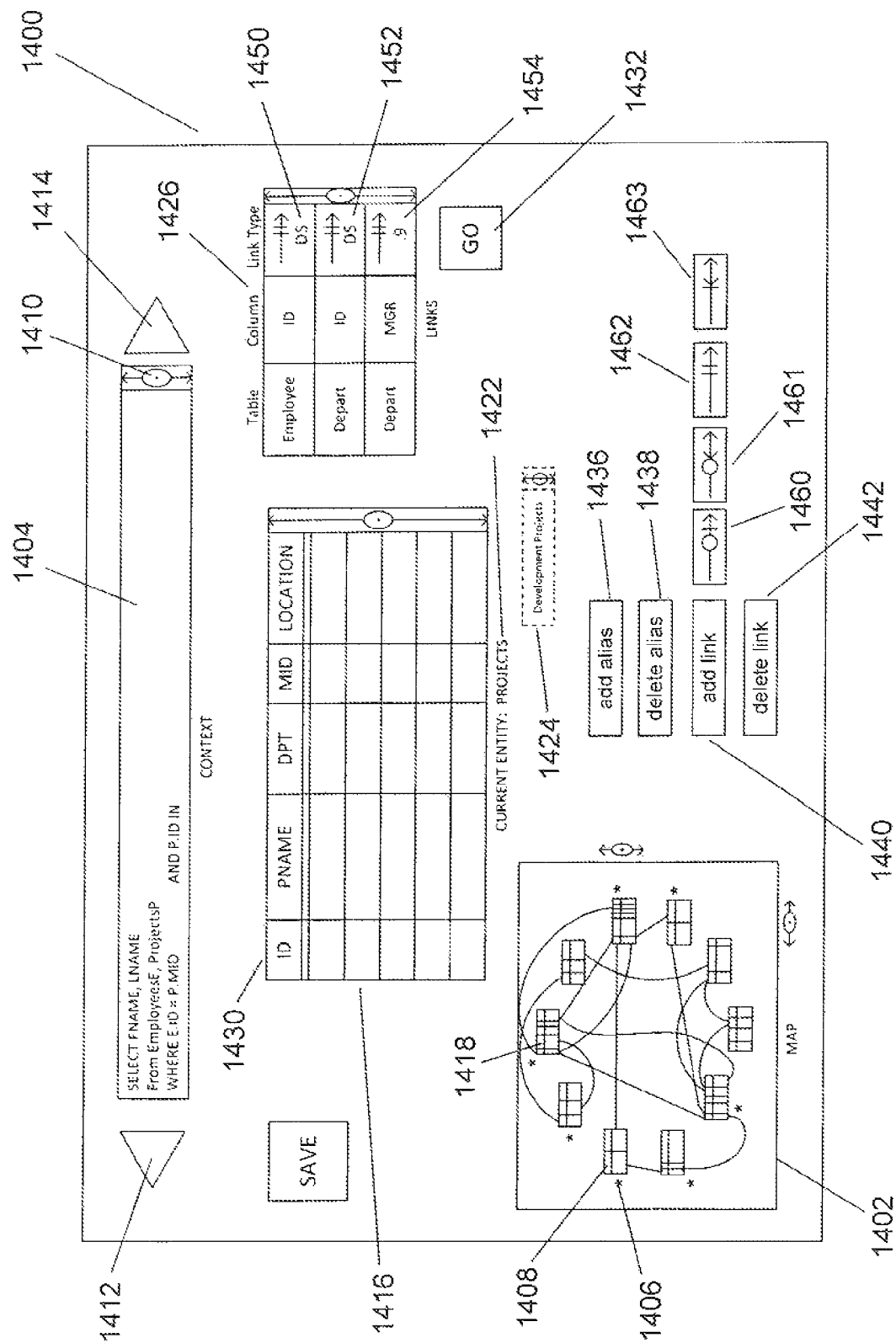
FIG. 14 illustrates an example of one embodiment of the web-browser-like navigational tool provided by one embodiment of the present invention.

FIG. 14 illustrates an example of one embodiment of the web-browser-like navigational tool provided by one embodiment of the present invention. The navigational tool 1400 is displayed on a computer monitor by a computer system that implements a system embodiment of the present invention. The navigational tool is similar to a web browser. At the lower left-hand portion of the tool, a graphical rendering of the current entity-relationship diagram is provided 1402. For large entity-relationship diagrams, the displayed diagram 1402 may function as a window into the larger entity-relationship diagram, which can be panned across the larger entity-relationship diagram, providing views of portions of the larger entity-relationship diagram, much as a cursor may be moved over text or an image.

In the context-display window 1404, the navigational tool displays one or more queries or other information that constitutes a context. In general, a database may be viewed, or understood, from numerous different contexts. For example, as discussed above, a database may serve as the data repository for a combined accounting and personnel system. One view of the data is obtained from considering the data from the standpoint of the accounting portion of this system, and another view is obtained from viewing the data from the standpoint of the personnel portion of the system. Different contexts may overlap, to some degree, but each may view different tables in different ways, and certain tables may be considered in one context, but not in another. For example, in the combined accounting and personnel information system, tables associated with research and development expenses may be an important entity from the standpoint of the accounting context, but may not play any role in the personnel context. In certain embodiments of the present invention, context-defining information may be automatically extracted from many sources. One source is embedded SQL statements in various application programs. These may be extracted from the application programs, or may be intercepted, at run time, using various RDBMS management tools or ad hoc tools created to monitor the queries passed to the RDBMS by application programs. The source of context information may be SQL queries embedded in stored procedures, within the database, the names of tables in the database schema, and other such information. Additionally, contexts may be defined by human analysts.

Initially, each context may be associated with a number of seed tables or entities. In FIG. 14, the seed tables for the initial entity-relationship diagram displayed in display window 1402 are marked with asterisks, such as asterisk 1406 marking table 1408. Seed tables may include, for example, those tables explicitly listed in SQL select statements associated with a context. A scrolling feature 1410 allows the user to scroll through all the context-defining information, and navigational tools 1412 and 1414 allow a user to navigate to the various different contexts determined in the currently analyzed data.

The navigational tool displays a representation of a current table 1416 in the center of the display navigation tool, and the current table is graphically highlighted 1418 in the displayed entity-relationship diagram. In certain embodiments, a user is able to scroll through the data in the table using a scrolling feature 1420. The database-schema name 1422 for the table is displayed, as well as a list of one or more aliases assigned to a table by a human analyst 1424. Alias definitions may facilitate an analyst's understanding of how tables are used and what they contain. Links that correspond to relationships and that link the table to other tables in the database are displayed in a link-display window 1426, with indications of a table and column to which relationships or potential relationships have been established for a particular selected column of the current table, in the example in FIG. 14, column 1430. Often, in entity-relation diagrams, relationships are shown only between primary-key and foreign-key columns. In one embodiment of the navigational tool, discussed with reference to FIG. 14, relationships are indicated between non-key columns within tables, reflecting the pairwise analysis of columns used to statistically infer relationships, discussed above with reference to FIG. 13. A user may click on a particular link, highlighting that link, and then click on the "go" button 1432 to navigate to that table. Alternatively, the links may be displayed as hyperlinks, allowing a user to directly access a table referenced by the link. Various control features are provided to allow a user to add an alias 1436, delete an alias 1438, add a link 1440, delete a link 1442, and update a link.

Figure 15A:
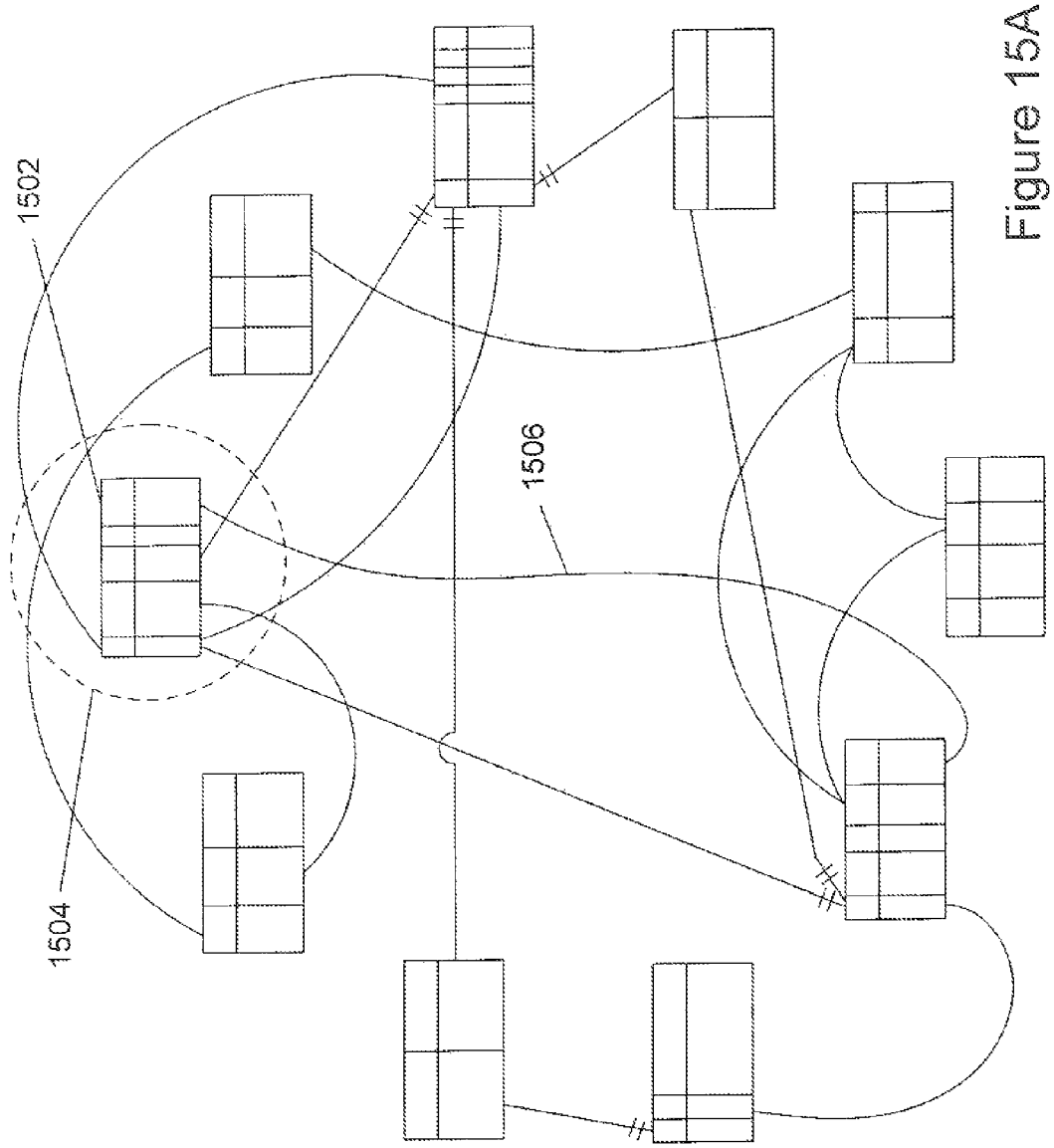
FIGS. 15A-C illustrate an example of the use of the navigational tool shown in FIG. 14.
Figure 15B:
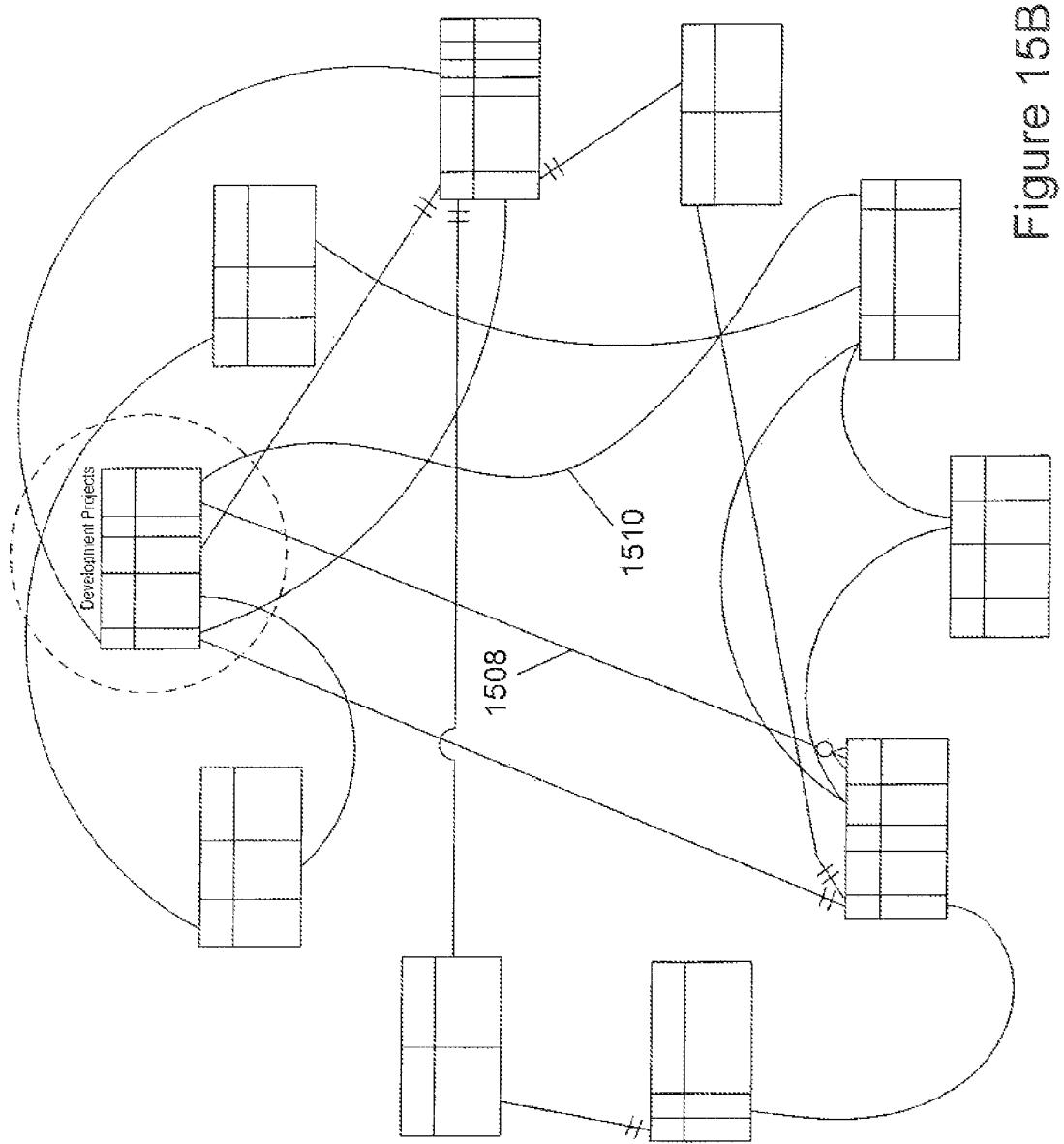
Figure 15C:
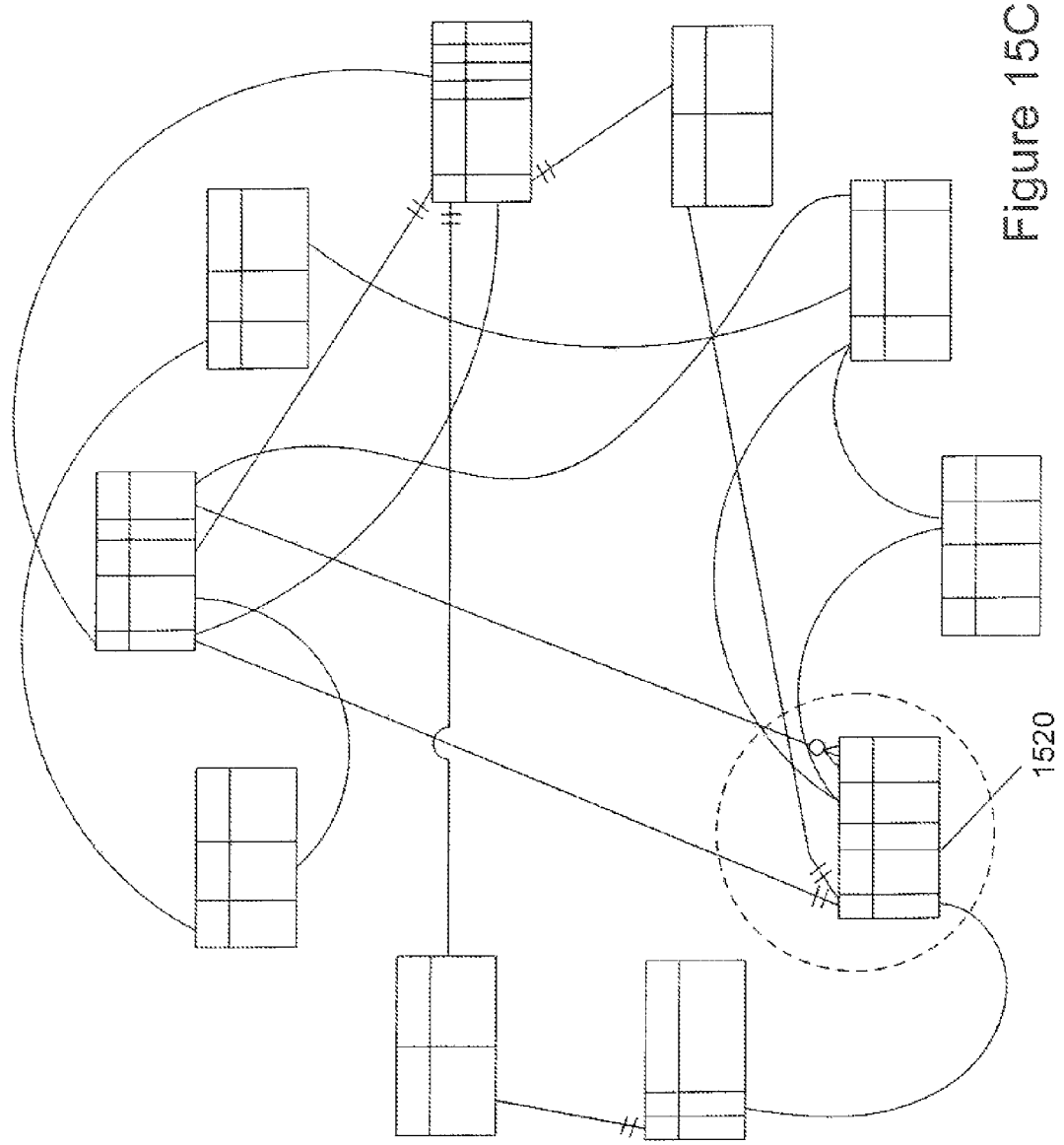

FIGS. 15A-C illustrate an example of the use of the navigational tool shown in FIG. 14. In FIG. 15A, a user has selected table 1502 as the currently displayed table, indicated in FIG. 15A by the dashed circle 1504 around the table. The user uses various of the tools provided by the navigational device to update the underlying entity-relationship diagram, as shown in FIG. 15B. For example, the statistically-inferred relationship 1506 in FIG. 15A is converted, by the user, to an optional, one-to-many relationship 1508 in FIG. 15B. Note that the link types are displayed in the link-display window (1426 in FIG. 14) and editing features 1460-1463 are provided to allow a user to alter the type of link, based on a user's analysis. In FIG. 14, links derived from database schema are shown with the "DS" annotation 1450 and 1452, while a statistically-inferred link is shown with the inference score 1454, computed by the "relations" routine discussed with reference to FIGS. 12A-D, to provide an indication of the strength of the statistical inference. Another example of an update operation is the addition of link 1510 in FIG. 15B. As shown in FIG. 15C, when the user is temporarily finished with a particular table, the user can use the "go" button (1432 in FIG. 14), or click directly on links, to navigate to another table 1520. In certain embodiments of the present invention, a user may also be allowed to tables not linked by relations to the current table by clicking on tables in the displayed entity-relationship diagram 1402.

There are many different possible embodiments of the navigational tool, one embodiment of which is shown in FIG. 14. Many additional entity-relationship-diagram editing and annotation tools may be included and, in alternative embodiments, the user may enter and store analysis in text or using other relationship-encoding paradigms.

Figure 16A:
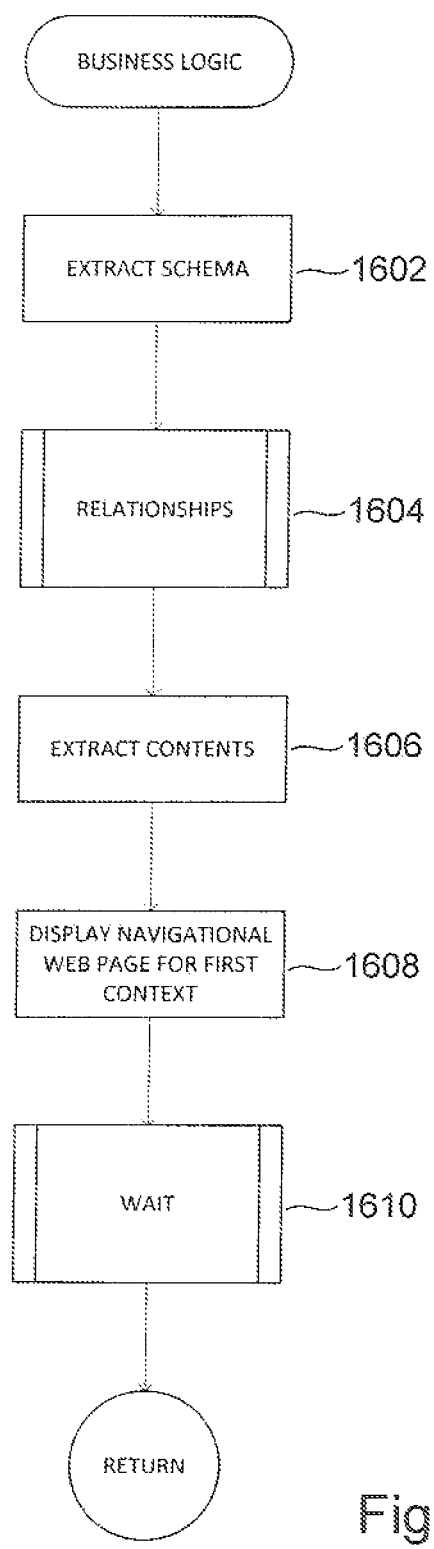
FIGS. 16A-B provide an example flow-control diagram for the overall logic-extraction method that represents one embodiment of the present invention.
Figure 16B:
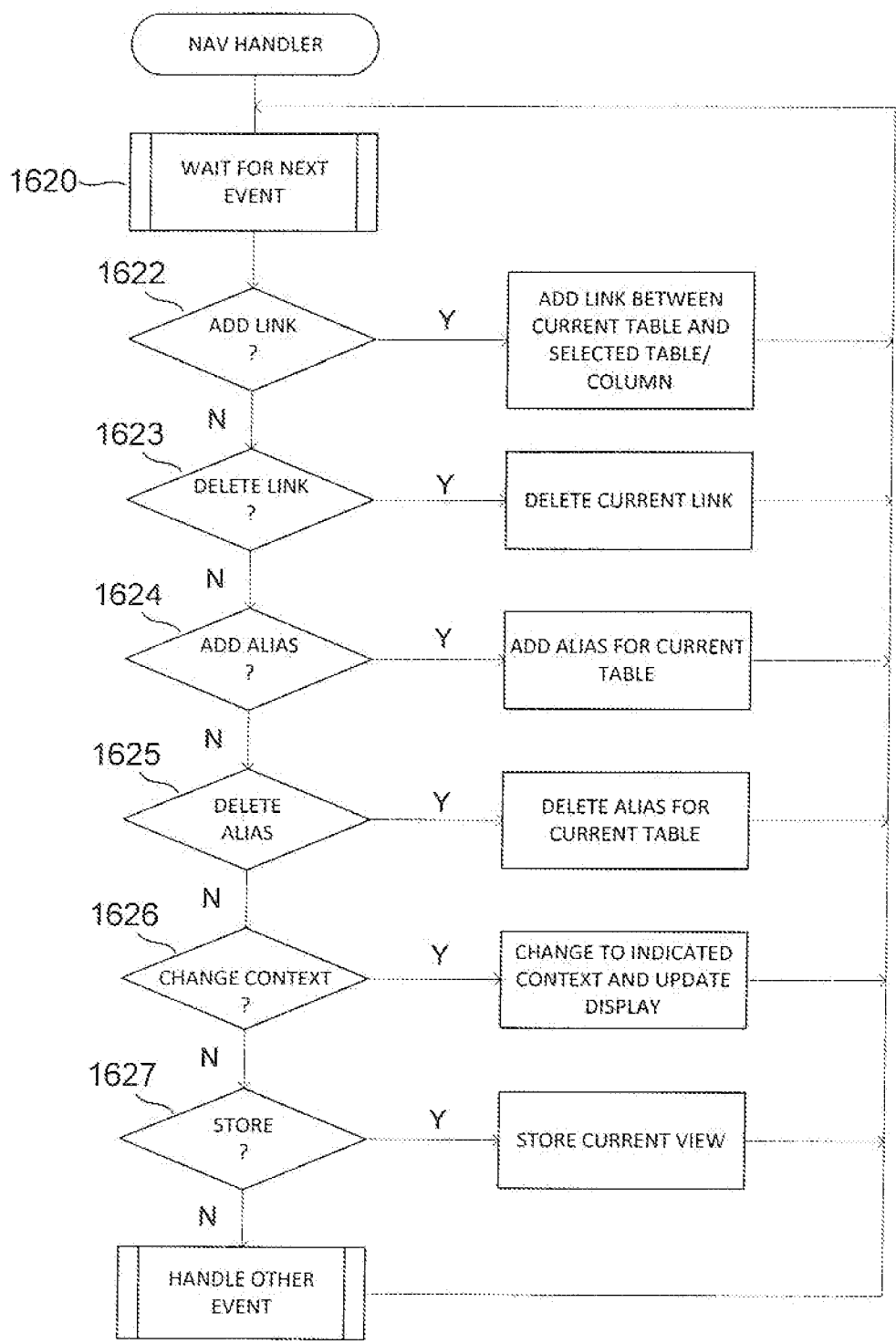

FIGS. 16A-B provide an example flow-control diagram for the overall logic-extraction method that represents one embodiment of the present invention. In step 1602 of FIG. 16A, the database schema is extracted from a database that is to be analyzed. From the extracted schema, data entities are identified and initial relationships are established between the identified data entities. FIG. 8, discussed above, represents the type of initial data available at the completion of step 1602. Next, in step 1604, the routine "relationships," discussed above with reference to FIGS. 12A-D, is called in order to statistically derive additional relationships between entities. FIG. 13, discussed above, illustrates the type of data available to an analyst at the completion of step 1604. In step 1606, information used to derive one or more contexts is extracted from various sources, including the data within the database, application programs that interface to the database, real-time monitors that monitor queries submitted by application programmers and human users to the RDBMS, and/or from human analysts. Then, in step 1608, an initial context is automatically selected and the navigational tool, one example of which is discussed with reference to FIG. 14, is displayed for the initial context. Finally, a wait state is entered 1610 in which events related to a user's interaction with a navigational tool are handled.

FIG. 16B provides a control-flow diagram that illustrates an event handler for the analysis system that represents one embodiment of the present invention. In step 1620, the event handler waits for a next event to occur. When a next event occurs, the type of event is determined, in a series of conditional steps 1622-1627, and as appropriate action is taken for the event.

Although the present invention has been described in terms of particular embodiments, it is not intended that the invention be limited to these embodiments. Modifications will be apparent to those skilled in the art. For example, as discussed above, method and system embodiments of the present invention may be directed to preparing entity-relationship diagrams for data by human analysts, as discussed above, or may alternatively use other types of relationship representations and information encodings. As discussed above, the navigational tool may have many different alternative embodiments, with many different types of navigational and relationship-encoding and annotating tools. Method and system embodiments of the present invention, including the navigational tool, may provide many additional features for selecting databases for analysis, storing results, retrieving partial, stored results and resuming analysis, and other such tasks and operations. Method and system embodiments of the present invention may be implemented as computer programs, which execute on one or more electronic computer systems, to provide output to a human analyst through various different graphical user interfaces displayed on computer-display devices. In addition, system embodiments of the present invention may also communicate results to remote computer systems and output results by printing or file transfer, in addition to displaying results through graphical user interfaces. Embodiments of the present invention may vary with various different choices for design and implementation parameters, including programming language, operating system, control structures, data structures, modular organization, and other such implementation parameters.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A data-analysis system, implemented as one or more processors that execute one or more computer programs, comprising:
   a metadata-extraction component implemented at the one or more processors that extracts indications of data entities and relationships between data entities from data stored on one or more electronic-memory and mass-storage devices;
   a relationship-inference component, to define a keyword index including reference lists based on values of entries in a plurality of data-type compatible columns, implemented at the one or more processors that analyzes the data within two or more contexts to infer additional relationships between data entities based on mutual occurrence of a plurality of columns identified in one or more reference lists of the keyword index, wherein each context of the two or more contexts is a particular database view of the data; and a context-determination component implemented at the one or more processors that determines the two or more contexts within which the data is analyzed.

2. The data-analysis system of claim 1 wherein the data is relational data managed by a relational database system, the data entities are relational-database tables, and the relationships are constraints specified for columns of the relational-database tables, including foreign-key constraints.

3. The data-analysis system of claim 1 wherein the relationship-inference component analyzes the data to infer additional relationships between data entities by:
constructing all possible pairs of data-type-compatible components of the data entities;
filtering the possible pairs of data-type-compatible components of the data entities to produce candidate relationships; and
evaluating the candidate relationships, using statistics and/or metrics computed for the data entities, to produce the additional relationships.

4. The data-analysis system of claim 1 wherein the relationship-inference component evaluates a candidate relationship to determine whether or not the candidate relationship constitutes an additional relationship by comparing at least one of:
a fraction of the entries in a first column of the plurality of data-type-compatible columns with values that occur in entries of a second column of the plurality of data-type-compatible columns; and
a fraction of entries in the second column with values that occur in entries of the first column.

5. The data-analysis system of claim 1 wherein the context-determination component determines the two or more contexts within which the data is analyzed by one or more of:
extracting identities of data entities referenced in queries directed to a database management system that manages the data by one or more application programs;
extracting identities of data entities in stored queries within the data; and
extracting identities of data entities in queries embedded in application programs.

6. The data-analysis system of claim 1, wherein the context-determination component extracts context-defining information from queries and determines the context based on the context-defining information.

7. The data-analysis system of claim 1, wherein:
each value of a plurality of values in the keyword index associated with a reference list identifying two or more of the plurality of data-type compatible columns; and
the relationship-inference component infers an additional relationship between a first data entity and a second data entity from the data entities in response to determining that each of one or more reference lists identifies a data-type compatible column of the first data entity and a data-type compatible column of the second data entity.

8. A data-analysis system, implemented as one or more processors that execute one or more computer programs, comprising:
a metadata-extraction component implemented at the one or more processors that extracts indications of data entities and relationships between data entities from data stored on one or more electronic-memory and mass-storage devices;
a relationship-inference component, to define a keyword index including reference lists based on values of entries in a plurality of data-type compatible columns, implemented at the one or more processors that analyzes the data within two or more contexts to infer additional relationships between data entities based on mutual occurrence of a plurality of columns identified in one or more reference lists of the keyword index, wherein each context of the two or more contexts is a particular database view of the data; and
a context-determination component implemented at the one or more processors that determines the two or more contexts within which the data is analyzed; and
a navigational analysis tool that provides an interface that allows for navigation between relationship-interconnected data entities within each of one or more contexts, for viewing representations of data entities and relationships, and for editing and updating the relationships.

9. The data-analysis system of claim 8 wherein the navigational analysis tool, displayed on a computer device, provides an interface comprising:
a displayed representation of already determined data entities and relationships associated with a displayed context;
a displayed representation of a currently selected data entity;
a displayed representation of the already determined relationships between the currently selected data entity and the already determined data entities associated with a displayed context; and
navigational and editing features.

10. The data-analysis system of claim 9 wherein the navigational and editing features include one or more of:
an interface feature that allows an analyst to navigate from the currently selected data entity to another data entity related by an already determined relationship with the data entity;
an interface feature that allows an analyst to add relationships between data entities;
an interface feature that allows an analyst to delete a relationship between data entities;
an interface feature that allows an analyst to add an alias for the currently selected data entity; and
an interface feature that allows an analyst to delete an alias for the currently selected data entity.

11. The data-analysis system of claim 9 wherein the displayed representation of the already determined relationships between the currently selected data entity and the already determined data entities associated with a displayed context include indications, for each displayed relationship, of a type of relationship to which the displayed relationship belongs and indications, for each statistically-inferred displayed relationship, of the strength of the statistical inference.

12. The data-analysis system of claim 8, wherein the context-determination component extracts context-defining information from queries and determines the context based on the context-defining information.

13. The data-analysis system of claim 8, wherein:
each value of a plurality of values in the keyword index associated with a reference list identifying two or more of the plurality of data-type compatible columns; and
the relationship-inference component infers an additional relationship between a first data entity and a second data entity from the data entities in response to determining that each of one or more reference lists identifies a data-type compatible column of the first data entity and a data-type compatible column of the second data entity.

14. A method for computational analysis of data stored within a database management system, the method comprising:
- extracting, by an electronic data-analysis system that defines a keyword index including reference lists based on values of entries in a plurality of data-type compatible columns, indications of data entities and relationships between data entities from data stored on one or more electronic-memory and mass-storage devices;
- analyzing, by the electronic data-analysis system, the data within two or more contexts to infer additional relationships between data entities based on mutual occurrence of a plurality of columns identified in one or more reference lists of the keyword index, wherein each context of the two or more contexts is a particular database view of the data;
- determining, by the electronic data-analysis system, the two or more contexts within which to analyze the data; and
- displaying on a computer device, by the electronic data-analysis system, a navigational analysis tool that provides an interface that allows for navigation between relationship-interconnected data entities within each of one or more contexts, for viewing representations of data entities and relationships, and for editing and updating the relationships.

15. The method of claim 14 wherein analyzing the data to infer additional relationships between data entities further includes:
- constructing all possible pairs of data-type-compatible components of the data entities;
- filtering the possible pairs of data-type-compatible components of the data entities to produce candidate relationships; and
- evaluating the candidate relationships, using statistics and/or metrics computed for the data entities, to produce the additional relationships.

16. The method of claim 15 wherein evaluating the candidate relationships to produce the additional relationships further includes comparing at least one of:
- a fraction of the entries in a first column of data-type-compatible columns with values that occur in entries of a second column of the data-type-compatible columns; and
- a fraction of entries in the second column with values that occur in entries of the first column.

17. The method of claim 14 wherein determining the two or more contexts within which to analyze the data further includes one or more of:
- extracting identities of data entities referenced in queries directed to a database management system that manages the data by one or more application programs;
- extracting identities of data entities in stored queries within the data; and
- extracting identities of data entities in queries embedded in application programs.

18. The method of claim 14 wherein the navigational analysis tool, displayed on a computer device, provides an interface comprising:
- a displayed representation of already determined data entities and relationships associated with a displayed context;
- a displayed representation of a currently selected data entity;
- a displayed representation of the already determined relationships between the currently selected data entity and the already determined data entities associated with a displayed context; and
- navigational and editing features.

19. The method of claim 14, wherein:
- the electronic data-analysis system extracts context-defining information from queries and determines the context based on the context-defining information;
- each value of a plurality of values in the keyword index associated with a reference list identifying two or more of the plurality of data-type compatible columns; and
- the electronic data-analysis system infers an additional relationship between a first data entity and a second data entity from the data entities in response to determining that each of one or more reference lists identifies a data-type compatible column of the first data entity and a data-type compatible column of the second data entity.

* * * * *